US012674368B2

(12) United States Patent (10) Patent No.: US 12,674,368 B2
Reynolds et al. (45) Date of Patent: Jul. 7, 2026

(54) SYSTEMS, METHODS AND APPARATUS FOR IMPROVED MANAGEMENT OF HYDRAULICALLY ACTUATED DEVICES AND RELATED SYSTEMS

(71) Applicant: TRANSOCEAN SEDCO FOREX VENTURES LIMITED, Grand Cayman (KY)

(72) Inventors: Scott Reynolds, Houston, TX (US); Craig Mccormick, Houston, TX (US); Robert Eugene Mebane, III, Houston, TX (US)

(73) Assignee: TRANSOOCEAN SEDCO FOREX VENTURES LIMITED, Hamilton (BM)

( * ) Notice: Subject to any disclaimer, the term of this patent is extended or adjusted under 35 U.S.C. 154(b) by 338 days.

(21) Appl. No.: 18/276,632

(22) PCT Filed: Feb. 10, 2022

(86) PCT No.: PCT/US2022/015931
§ 371 (c)(1),
(2) Date: Aug. 9, 2023

(87) PCT Pub. No.: WO2022/173914
PCT Pub. Date: Aug. 18, 2022

(65) Prior Publication Data

US 2024/0133262 A1 Apr. 25, 2024
US 2024/0229591 A9 Jul. 11, 2024

Related U.S. Application Data

(60) Provisional application No. 63/147,949, filed on Feb. 10, 2021.

(51) Int. Cl.
*E21B 33/06* (2006.01)
*G05B 13/02* (2006.01)

(52) U.S. Cl.
CPC ........ *E21B 33/063* (2013.01); *G05B 13/0265* (2013.01)

(58) Field of Classification Search
CPC .... E21B 33/063; E21B 33/0355; E21B 33/06; E21B 33/061; E21B 33/064; E21B 34/16; G05B 13/0265; G05B 13/02
See application file for complete search history.

(56) References Cited

U.S. PATENT DOCUMENTS 3,802,335 A 4/1974 Longo
4,337,653 A 7/1982 Chauffe
(Continued)

FOREIGN PATENT DOCUMENTS

AU 2017273551 A1 1/2019
AU 2017324363 A1 4/2019
(Continued)

OTHER PUBLICATIONS

European Search Report issued Nov. 11, 2024 in EP Application No. 22753322.1.
(Continued)

*Primary Examiner* — Kidest Worku
(74) *Attorney, Agent, or Firm* — Panitch Schwarze Belisario & Nadel LLP

(57) ABSTRACT

Embodiments disclosed include BOP systems and methods for actuation of a BOP function by manipulating a component associated with a BOP. Embodiments of the disclosed BOP systems and the methods of operation of the BOP systems are further configured to monitor and/or control the actuation of a BOP function, by receiving information related to the actuation from a set of sensors associated with the component. Embodiments of the systems and/or meth-
(Continued)

ods include modeling actuation of the component; the actuation of the component being based on analyses derived from the modeling.

17 Claims, 16 Drawing Sheets

(56)                    References Cited

U.S. PATENT DOCUMENTS

| | | | |
|---|---|---|---|
| 4,630,214 | A | 12/1986 | Barney et al. |
| 5,748,077 | A | 5/1998 | Brandt |
| 8,843,328 | B2 * | 9/2014 | Curtiss, III ............. E21B 34/16 |
| | | | 702/50 |
| 9,587,454 | B1 * | 3/2017 | Beard ..................... E21B 34/16 |
| 2002/0014338 | A1 | 2/2002 | Purkis et al. |
| 2006/0108127 | A1 | 5/2006 | Batthala et al. |
| 2015/0104328 | A1 | 4/2015 | Babbitt et al. |
| 2016/0237773 | A1 | 8/2016 | Dalton et al. |
| 2016/0340998 | A1 | 11/2016 | Holmes |
| 2017/0130550 | A1 | 5/2017 | Carbaugh et al. |
| 2017/0362929 | A1 | 12/2017 | Leach et al. |
| 2019/0278260 | A1 | 9/2019 | Dalton et al. |
| 2019/0368299 | A1 * | 12/2019 | Jorud ..................... E21B 34/066 |
| 2021/0025411 | A1 * | 1/2021 | Christopherson ..... F15B 20/004 |

FOREIGN PATENT DOCUMENTS

| | | |
|---|---|---|
| CN | 106103884 B | 8/2020 |
| WO | 2017210308 A1 | 12/2017 |
| WO | 2018048867 A1 | 3/2018 |

OTHER PUBLICATIONS

International Search Report and Written Opinion issued May 17, 2022 in Interntional Application No. PCT/US22/15931.

Preliminary Office Action Issued Jun. 17, 2025 in BR Application No. 112023015987-3 (with English Translation).

Notice of Acceptance issued Jun. 26, 2025 in AU Application No. 2022221361.

Australian Examination Report issued Aug. 14, 2024 in Application No. 2022221361.

Office Action issued Mar. 17, 2026 in BR Application No. 112023015987-3 (with English Translation).

* cited by examiner

200

Processor 230

Detector 232

System Controller 234

Model 236

Run time calculation

900

| Speed | % | GPM | GPS |
|---|---|---|---|
| 1800 | 100% | 120.0 | 2.00 |
| 1710 | 95% | 114.0 | 1.90 |
| 1620 | 90% | 108.0 | 1.80 |
| 1530 | 85% | 102.0 | 1.70 |
| 1440 | 80% | 96.0 | 1.60 |
| 1350 | 75% | 90.0 | 1.50 |
| 1260 | 70% | 84.0 | 1.40 |
| 1170 | 65% | 78.0 | 1.30 |
| 1080 | 60% | 72.0 | 1.20 |
| 990 | 55% | 66.0 | 1.10 |
| 900 | 50% | 60.0 | 1.00 |
| 810 | 45% | 54.0 | 0.90 |
| 720 | 40% | 48.0 | 0.80 |

| Speed | % | GPM | GPS |
|---|---|---|---|
| 630 | 35% | 42.0 | 0.70 |
| 540 | 30% | 36.0 | 0.60 |
| 450 | 25% | 30.0 | 0.50 |
| 360 | 20% | 24.0 | 0.40 |
| 270 | 15% | 18.0 | 0.30 |
| 180 | 10% | 12.0 | 0.20 |
| 90 | 5% | 6.0 | 0.10 |
| 72 | 4% | 4.8 | 0.08 |
| 54 | 3% | 3.6 | 0.06 |
| 36 | 2% | 2.4 | 0.04 |
| 27 | 1.50% | 1.8 | 0.03 |
| 18 | 1% | 1.2 | 0.02 |
| 0 | 0% | 0.0 | 0.00 |

SYSTEMS, METHODS AND APPARATUS FOR IMPROVED MANAGEMENT OF HYDRAULICALLY ACTUATED DEVICES AND RELATED SYSTEMS

CROSS-REFERENCE TO RELATED APPLICATIONS

This application is a Section 371 of International Application No. PCT/US22/15931, filed Feb. 10, 2022, which was published under International Publication No. WO2022/173914, and which claims priority to U.S. Provisional Application No. 63/147,949 entitled "Systems, Methods And Apparatus For Improved Management Of Hydraulically Actuated Devices And Related Systems" filed Feb. 10, 2021. The entire disclosures of both related applications are incorporated herein by reference.

FIELD OF THE DISCLOSURE

Embodiments of the current disclosure relates generally to blowout preventer control systems, and more specifically, but not by way of limitation, to blowout preventer control systems including instrumentation configured to use information obtained from one or more pressure transducers and/or to control one or more components of a blowout preventer.

BACKGROUND

A blowout preventer (BOP) is a mechanical device, usually installed redundantly in stacks, used to seal, control, and/or monitor oil and gas wells. Blowout preventers are critical to the safety of crew, rig (the equipment system used to drill a wellbore) and environment, and to the monitoring and maintenance of well integrity; thus, blowout preventers are intended to provide fail-safety to the systems that include them.

Typically, a blowout preventer includes a number of devices, such as, for example, rams, annulars, accumulators, test valves, failsafe valves, kill and/or choke lines and/or valves, riser joints, hydraulic connectors, and/or the like, many of which may be hydraulically actuated. Typically, in a subsea well, such hydraulic actuation is achieved by pumping hydraulic fluid from a surface installation, through one or more hydraulic lines, and to the subsea blowout preventer. BOP operational events may account for approximately 50% of equipment-related non-productive downtime (NPT) for deep-water drilling rigs. Among such BOP operational events, approximately 55% may be directly linked to malfunctions in a BOP control system. Typically, BOPs and BOP control systems ("BOP systems") are operated and maintained on a largely trial-and-error basis. For example, in a typical BOP system, an operator may have to exercise some degree of subjective judgment as to when a particular BOP system component should be undergoing maintenance, be replaced, and/or the like. While maintenance plans and other system requirements may exist for particular components, these plans and requirements are typically developed after the components have been designed and/or implemented. Thus, in some instances, components may be under-maintained and/or implemented beyond their useful life, leading to component failure, and in other instances, components may be unnecessarily maintained and/or replaced, increasing operating costs and/or presenting a risk of self-induced and/or premature component failure. Additionally, in the event of a BOP system component failure, such existing BOP systems typically require costly NPT to adequately identify the failed component in a process of elimination approach—sometimes necessitating extraction of the BOP to the surface. Recently, some BOP systems have incorporated limited component monitoring and reporting capability. However, such incremental improvements fail to address the importance of BOP system availability, reliability, and fault-tolerance, particularly when dealing with safety-critical BOP functions.

Existing BOP systems, including those with limited component monitoring and reporting capability, may also fail to adequately monitor and/or report the operational condition of one or more components of the BOP system (e.g., whether a pipe is present in a BOP annulus, a location of the pipe in a BOP annulus, a state of shearing of a pipe in use of a BOP, etc.). Such operational conditions may play a crucial role in making proper operational and/or maintenance choices with respect to BOP system components and components related thereto.

Thus, there exists a need for a control system that is configured to acutely monitor and control the operation of one or more components of a BOP.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 9 is a table illustrating an example set of run time calculations associated with the operation of a BOP control system, according to some embodiments.

DETAILED DESCRIPTION

Figure 1:
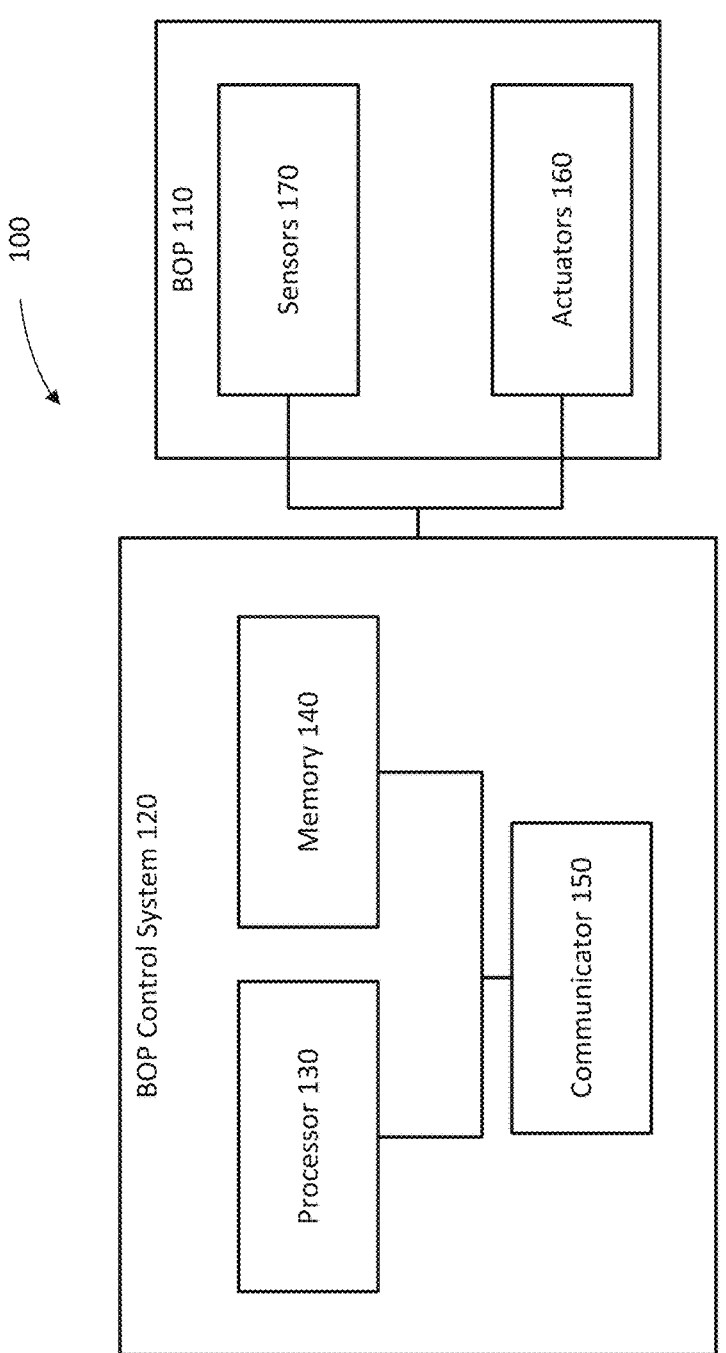
FIG. 1 is an example schematic illustration of a subsea BOP control system, according to some embodiments.

In some embodiments, a BOP control system includes a system controller configured to actuate a first BOP function by communicating one or more commands to one or more nodes of a functional pathway selected from at least two functional pathways associated with the first BOP function. Each node from the one or more nodes includes an actuatable component configured to be actuated in response to a command received from the system controller. Each node has one or more sensors configured to capture a first data set representative of or corresponding to actuation of the component. The BOP control system further includes a processor configured to analyze the first data set to determine a state associated with the component, and communicate information related to the state of the component to the system controller. The system controller is configured to receive the information related to the state of the component, determine a course of action of the first BOP function, based on the state of the component, and identify at least one of the at least two functional pathways for actuating the first BOP function based, according to the course of action. The system controller is configured to generate and send updated commands to the one or more nodes to implement the course of action.

Some embodiments of the present BOP control systems comprise: a system controller configured to actuate a first BOP function by communicating one or more commands to one or more nodes of a functional pathway selected from one or more available functional pathways associated with the first BOP function; each node comprising an actuatable component configured to actuate in response to a command received from the system controller, each node having one or more sensors configured to capture a first data set during an actuation of the component and a processor configured to adjust one or more coefficients of a model such that the adjusted model approximates one or more values from the first data set; and communicate to the system controller data based at least on at least one of the one or more coefficients of the adjusted model.

In some embodiments, the component of at least one node includes a hydraulic manifold including one or more actu-atable valves. In some embodiments, the component of at least one node includes a hydraulic pump. In some embodiments, the hydraulic pump is battery powered. In some embodiments, at least one node includes a sensor configured to sense at least one physical parameter associated with the node. A physical parameter can include, for example, a vibration, a sound, a sonic transient, a pressure, a force, a temperature and/or the like. Variations in the at least one physical parameter and/or the relationship of the physical parameter to an event (e.g., a pipe being sheared) can be suitably characterized.

In some embodiments, the processor is configured to compare the first data set, that is representative of or corresponding to actuation of the component, to a second data set corresponding to a simulation of actuation of the component. The processor is further configured to generate a flag based on the comparison and communicate the flag to the system controller if differences between the first data set and the second data set exceed a threshold.

In some embodiments, the BOP control system includes a memory configured to store at least a portion of the first data set. In some embodiments, the memory is configured to store at least a portion of the second data set. Some embodiments include a portion of the memory being in communication with each node of a functional pathway.

In some embodiments, at least one node is configured to communicate with the system controller wirelessly. In some embodiments, at least one node is configured to communicate with the system controller through a wired connection. In some embodiments, at least one node is configured to communicate with at least one controller outside of the BOP control system. In some embodiments, the system controller is configured to scan the BOP control system for available functional pathways for actuating the first BOP function. In some embodiments, the system controller is configured to communicate to a user a number of available functional pathways for actuating the first BOP function. In some embodiments, the system controller is configured to a remotely coupled user device. In some embodiments, the system controller is configured to be operated via the remotely coupled user device. In some embodiments, the system controller is configured to receive an input, from the user device, the input indicating a selection of a specified functional pathway by a user (e.g., an operator) for actuating the first BOP function. The system controller is further configured to initiate, based on the input, an actuation of the first BOP function via the specified functional pathway selected by the user.

In some embodiments, the one or more available functional pathways includes a first functional pathway and a second functional pathway. The system controller is configured to actuate the first BOP function by communicating one or more commands to one or more nodes of the second functional pathway in response to a signal indicating that one or more nodes of the first functional pathway has experienced a fault and/or has communicated a fault to the system controller.

In some implementations, a system can include a first set of functional pathways configured to perform a defined function, and one or more additional sets of functional pathways serving as reductant pathways, also configured to perform the defined function. For example, one or more functional pathways in a rig or system implementing the BOP control system can include a first set of fluidic and/or hydraulic pathways configured to implement a closing of an upper blind shear ram on. The rig or system can, in some embodiments, include a second set (e.g., a secondary and/or redundant set of pathways) configured via one or more acoustic hydraulic lines which are also configured (e.g., plumbing, etc.) in a manner to close the upper blind shear ram.

Some embodiments of the present methods for actuating a BOP function include selecting a first functional pathway from two or more available functional pathways associated with a first BOP function and communicating one or more commands to an actuatable component of each of one or more nodes of the first functional pathway to actuate the component. The actuation of the component of each of the one or more nodes of the first functional pathway actuates the first BOP function. The embodiments further include receiving, from at least one of the one or more nodes of the first functional pathway, information associated with actuation of the component. Some embodiments include storing the received information in a memory.

Some embodiments include scanning a BOP control network for available functional pathways for actuating the first BOP function. Some embodiments include communicating to a user a number of available functional pathways for actuating the first BOP function. Some embodiments include automatically selecting a particular functional pathway from the number of available pathways, based on a set of calculations associated with each functional pathway from the number of available pathways, and/or a set of predetermined criteria. In some instances, the set of calculations associated with each functional pathway include energy required to implement the actuation, time required to implement the actuation, fluid required to implement the actuation, potential secondary effects of implementing the actuation. Some embodiments include indicating the particular functional pathway that is automatically selected to a user prior to initiating the actuation of the first BOP function via the particular functional pathway. Some embodiments include an override functionality provided to the user, that is configured to prevent the initiation of the actuation of the first BOP function via the particular functional pathway.

The terms "a" and "an" are defined as one or more unless this disclosure explicitly requires otherwise. Further, a device or system (or a component of either) that is configured in a certain way is configured in at least that way but can also be configured in other ways than those specifically described. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus or system that "comprises," "has," "includes," or "contains" one or more elements possesses those one or more elements but is not limited to possessing only those elements. Likewise, a method that "comprises," "has," "includes," or "contains" one or more steps possesses those one or more steps but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments. Some details associated with the embodiments are described above and others are described below.

Blowout Preventer (BOP),

A blowout preventer (BOP), which is a specialized mechanical device, is used at drilling rigs to seal, control and monitor oil and gas wells to prevent blowouts, the uncontrolled release of crude oil and/or natural gas from the well. A BOP can be installed to control the downhole (occurring in the drilled hole) pressure and the flow of oil and gas, and to prevent tubing (e.g., drill pipe and well casing), tools and drilling fluid from being blown out of the wellbore (also known as bore hole, the hole leading to the reservoir) when a blowout threatens. A BOP can be controlled by a BOP control system configured to communicate with the one or more components included in the BOP and to actuate the one or more components to carry out one or more predefined BOP functions.

Referring now to the drawings, FIG. 1 is a schematic diagram illustrating a BOP system 100 including a BOP 110 and a BOP control system 120, according to an embodiment. The BOP system 100 presents an illustrative embodiment of the BOP systems described herein. The BOP system 100 can be substantially similar in structure and/or function to any of the BOP systems described in the co-pending U.S. Patent Application Publication No. 2019/0278260 entitled "BOP CONTROL SYSTEMS AND RELATED METHODS" (also referred to as the '260 application herein), the co-pending U.S. Patent Application Publication No. 2017/0362929 entitled "METHODS FOR ASSESSING THE RELIABILITY OF HYDRAULICALLY-ACTUATED DEVICES AND RELATED SYSTEMS" (also referred to herein as the '929 application), and/or the co-pending U.S. Patent Application Publication No. 2015/0104328 entitled "INTEGRATED MONITORING, CONTROL, AND ACTUATION FOR BLOWOUT PREVENTER (BOP) HYDRAULIC DEVICES" (also referred to herein as the '328 application). The contents of each one of the above-mentioned applications, to the extent not inconsistent with the present disclosure, are herein incorporated by reference in their entirety for all purposes.

The BOP 110 of FIG. 1 includes sensors 170 and actuators 160 among other components that are not shown for clarity purposes. As can be appreciated, some implementations of the BOP control system 100 may include BOPs that are of substantially more complexity (e.g., further BOP functions, functional pathways, nodes, components, and/or the like). The BOP 110 can be substantially similar in structure and/or function to any of the BOPs described in the '260 application, the '929 application, and/or the '328 application. In some implementations, the BOP control system 120 of the BOP system 100 can be included in a Lower Marine Riser Package (LMRP) and the BOP 110 can be a subsea BOP. The LMRP can include a connector to a well (e.g., a subsea oil well), other systems of control (e.g., a series of safety valves), and a connection at the top for connection to a riser pipe that provides an extension of a well to a surface drilling facility. The riser pipe can include a large diameter, low pressure main conduit with external auxiliary lines that include high pressure choke and kill lines for circulating fluids to the subsea BOP, and potentially other power, data, and/or control lines for the BOP.

The BOP 110 can, for example, include a single blowout preventer or any suitable number of blowout preventers, as well as a blowout preventer assembly that may include more than one blowout preventer in a suitable arrangement (e.g., a blowout preventer stack). The BOP 110 can be operably coupled to the BOP control system 120 and configured to perform BOP functions that can be controlled and/or instructed by the BOP control system 120. The BOP 110 can include one or more components such as a ram, annular, accumulator, test valve, failsafe valve, kill and/or choke line and/or valve, riser joint, hydraulic connector, and/or the like. The BOP 110 can be configured such that one or more functions associated with the one or more components can be controlled and/or instructed by the BOP control system 120 (e.g., open ram, close ram, and/or the like).

In some embodiments, the one or more components included in the BOP can be hydraulically actuated. The BOP 110 can include one or more functional pathways defining fluid flow pathways via which pressurized fluid can be directed to manipulate hydraulically actuatable components included in the BOP 110. In some embodiments, the functional pathways of BOP 110 can include one or more nodes associated with the BOP function. Each node can be a physical and/or electronic unit that can include an actuator (e.g., valves, pumps, etc.) that can be manipulated to control an actuatable component and/or one or more sensors (e.g., pressure transducers).

In some embodiments, a functional pathway associated with a node of the BOP 110 can include actuators 160 configured to manipulate the one or more components of the BOP 110. As an example, each node of the BOP 110 can include one or more actuatable components such as a ram, annular, accumulator, test valve, failsafe valve, kill and/or choke line and/or valve, riser joint, hydraulic connector, and/or the like.

In some embodiments, the components of the BOP can be configured to be hydraulically actuated via the actuators 160 by directed fluid flow. In some embodiments, the BOP 110 can include a pressure source (not shown) such as a storage unit of pressurized hydraulic fluid, that can be used to actuate the one or more components of the BOP 110 to perform BOP functions actuatable with the BOP control system 120. In some embodiments, the BOP 110 can include one or more pumping systems to provide pressurized hydraulic fluid flow via the functional pathways. The pressurized hydraulic fluid can be directed via specific functional pathways to perform specific BOP functions. BOP functions may include any suitable manipulation of a component of the BOP, such as, for example, a function associated with a ram, annular, accumulator, test valve, failsafe valve, kill and/or choke line and/or valve, riser joint, hydraulic connector, and/or the like (e.g., ram open, ram close, shear tubular, seal, and/or the like).

In some embodiments, the BOP 110 can be associated with one or more hydraulic fluid storage systems that are connected to the one or more components configured to be hydraulically actuated via directing hydraulic fluid via the one or more functional pathways to reach one or more specified actuators 160. For example, the actuators 160 can include a hydraulic pump (e.g., which may be powered by an electrical motor), and/or a set of actuatable vales on a hydraulic manifold (e.g., actuatable valves placed at strategic locations on the hydraulic manifold along functional pathways of BOP 110) allowing hydraulic fluid provided by the hydraulic pump to flow through the hydraulic manifold and to the first BOP function, thus actuating the first BOP function.

In some embodiments, the BOP 110 can be configured such that upon receiving instructions from the BOP control system 120 the pressure source can be manipulated via one or more pumping systems (e.g., subsea pumping systems) to actuate the one or more components of the BOP 110 via the actuators 160, as described in further detail below. In some embodiments, the BOP 110 can include one or more manifold assemblies including one or more functional pathways in which to direct hydraulic fluid to actuate the one or more components via the actuators 160. For example, the one or more components can include rams or annulars placed strategically along a bore well and connected to the BOP control system 120 via one or more actuators 160 (e.g., movable pistons, and/or the like) that can be hydraulically actuated.

The BOP 110 can be configured to receive instructions from the BOP control system 120 and direct pressurized fluid flow in a particular functional pathway and for example to a particular node associated with a component involved in a BOP function. The node can receive instructions and the node can be configured to actuate based on the instructions the actuators directed to a set of components, which may include actuating associated hydraulic pumps, and/or one or more actuatable valves of an associated hydraulic manifold. As an example, the node can command the actuators 160 to open a hydraulic fluid pathway directed to perform a specified BOP function. Said in another way, the BOP 110 can receive instructions from the BOP control system 120 and based on the instructions a node can command one or more actuators 160 (e.g., hydraulic pumps, actuatable vales in a hydraulic manifold, etc.) to channel flow of hydraulic fluid that can perform a first BOP function (e.g., actuate a ram).

In some embodiments, as described herein, the BOP 110 can include sensors 170 such as pressure transducers placed at strategic locations along the functional pathways and used to report back pressure of the hydraulic fluid used to actuate the one or more components. In some embodiments, for example, the pressure transducers can be 4-20 mA sensors. In some implementations, a fault inducing a 0 mA registered on a pressure transducer can be used as an indication that the sensor is not functioning properly. In this case, redundant sensors may become primary for system/control. Sensor drift over time can occur within limits. In some embodiments, sensing of pressure can be implemented on the high-pressure side of each pump line up via pressure transducers connected to the BOP control system 120 (e.g., an emergency subsea control system also referred to as the ESSCS)). In some implementations of the BOP 110, two pump line-ups can be present, operating in tandem and/or operating individually, when required. Pressure sensors 170 can be placed on both lines such that both operating scenarios can be detected and managed by the BOP control system 120.

In some embodiments, the BOP 110 can be equipped with sensors 170 for current sensing. The BOP 110 can be configured to operate using a Variable Frequency Drive (VFD) included in the BOP system 100. The VFD can be used to manage motor operations including, for example, starting and/or stopping motors, speed of motion, torque, etc. The BOP 110 can be configured such that sensing of current draw from the VFD can be used to obtain information related to operation of the one or more motors and/or pumps included in the BOP 110. As an example, feedback related to the current drawn can be used to estimate the work done by the motors and pumps to maintain torque against fluids used to pressurize and actuate one or more components (e.g., rams) of the BOP 110. Analysis of signals of pressure measured can be carried out in the context of changes in torque and/or the work involved by the pumps and motors to reach and maintain a specified pressure at a specified location of a BOP manifold.

In some embodiments, the BOP control system 120 can be a compute device or part of a compute device, which can be a hardware-based computing device and/or a multimedia device, such as, for example, a server, a desktop compute device, a smartphone, a tablet, a wearable device, a laptop and/or the like. As shown in FIG. 1, the BOP control system 120 includes a processor 130, a memory 140, and a communicator 150, all of which are operably interconnected.

The memory 140 of the BOP control system 120 can be, for example, a random-access memory (RAM), a memory buffer, a hard drive, a read-only memory (ROM), an erasable programmable read-only memory (EPROM), and/or the like. The memory 140 can store, for example, one or more software modules and/or code that can include instructions to cause the processor 130 to perform one or more processes, functions, and/or the like such as receive information form sensors 170 (e.g., pressure sensors, movement sensors, temperature sensors, and/or the like) associated with the BOP 110, infer a state of one or more components, send instructions to perform a BOP function, infer a stage of completion of a BOP function, etc. In some embodiments, the memory 140 can include extendable storage units that can be added and used incrementally. In some implementations, the memory 140 can be a portable memory (for example, a flash drive, a portable hard disk, and/or the like) that can be operatively coupled to the processor 130. In other instances, the memory can be remotely operatively coupled with the compute device. For example, a remote database server can serve as a memory and be operatively coupled to the compute device.

The communicator 150 can be a hardware device operatively coupled to the processor 130 and memory 140 and/or software stored in the memory 140 executed by the processor 130. The communicator 150 can include, for example, a network interface card (NIC), a Wi-Fi™ module, a Bluetooth® module and/or any other suitable wired and/or wireless communication device. Furthermore, the communicator 140 can include a switch, a router, a hub and/or any other network device. In some embodiments, the communicator 140 can be configured to connect (via wired connection and/or wireless connection) the BOP control system 120 to the BOP 110 to transmit and receive signals between the BOP control system 120 and the BOP 110, to perform BOP functions.

In some embodiments, the communicator 150 can be configured to connect the BOP control system 120 to a communication network (not shown in FIG. 1) to connect to other compute devices and/or remote servers. In some instances, the communicator 150 can be configured to connect to a communication network such as, for example, a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In other instances, the communication network can be a wireless network or a wired network such as, for example, an Ethernet network, a digital subscription line ("DSL")

network, a broadband network, and/or a fiber-optic network. In some instances, the communicator 150 can be configured to connect the BOP control system 120 to a communication network that can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via the network can be encrypted or unencrypted. In some instances, the communication network can include multiple networks or subnetworks operatively coupled to one another by, for example, network bridges, routers, switches, gateways and/or the like (not shown).

In some instances, the communicator 150 can facilitate receiving and/or transmitting signals and/or files through a communication network. In some embodiments, the communicator 150 can be configured to receive from the processor 130 information or data associated with a functioning of the BOP control system 120 and/or the BOP 110, and transmit the information or data to a remote system for implementing another BOP or BOP control system that is different from the BOP 110 or the BOP control system 120, but includes one or more similar components and/or configurations such that the data can be used in predicting, improving, and/or informing the implementation of the other BOP or BOP control system. For example, the communicator 150 can be configured to transmit data associated with BOP functioning in the BOP control system 120 associated with a first installation (e.g., first rig) to a system associated with a second installation (e.g., second rig) that is associated with a BOP control system or a BOP that includes equipment of the same or similar make and/or model as on the BOP 110 or BOP control system 120 associated with the first installation. The data transmitted from the first installation to the second installation can provide information which may be used to predict, improve and/or otherwise inform about the function of equipment associated with the second installation.

In some instances, a received file can be processed by the processor 130 and/or stored in the memory 140 and used to instruct the BOP 110 via the BOP control system 120 to perform one or more BOP functions as described in further detail herein. In some instances, as described previously, the communicator 150 can be configured to send data collected and/or analyzed by the processor 130 to a compute device that is connected to the BOP control system 120.

The processor 130 can be, for example, a hardware based integrated circuit (IC), or any other suitable processing device configured to run and/or execute a set of instructions or code. For example, the processor 130 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 130 can be operatively coupled to the memory 140 through a system bus (for example, address bus, data bus and/or control bus).

The processor 130 can be configured to receive BOP function information and associated instructions for example from a user via a user interface (e.g., a user interface displayed via display device not shown in FIG. 1). In some embodiments, the processor 130 can receive information from one or more sensors 170 included in the BOP 110 and infer knowledge related to one or more components included in the BOP 110 (e.g., information regarding the states of the one or more components, a stage of manipulation of the one or more components, etc.,) and/or one or more functional pathways of the BOP 110 (e.g., a driving force associated with an initiation or activation of a functional pathway to actuate a component, etc.), as described in further detail herein.

In some embodiments, the processor 130 can be configured to receive indication from a user and generate and send instructions to the BOP 110 to perform one or more BOP functions. In some embodiments, the processor 130 can be configured to automatically or programmatically monitor and receive information from a set of components, pathways, nodes, actuators and/or sensors included in the BOP 110 and based on information send instructions to manipulate the components, pathways, nodes, actuators and/or sensors to perform one or more BOP functions.

In some embodiments, the processor 130 can be configured to maintain logs or schedules of monitoring and functioning of the BOP 110 and the BOP control system 120 and associated instructions provided by the BOP control system 120. The processor 130 can also be configured to maintain a log of information related to the state (e.g., state of use and/or wear) of components, pathways, nodes, actuators and/or sensors included in the BOP 110.

Figure 2:
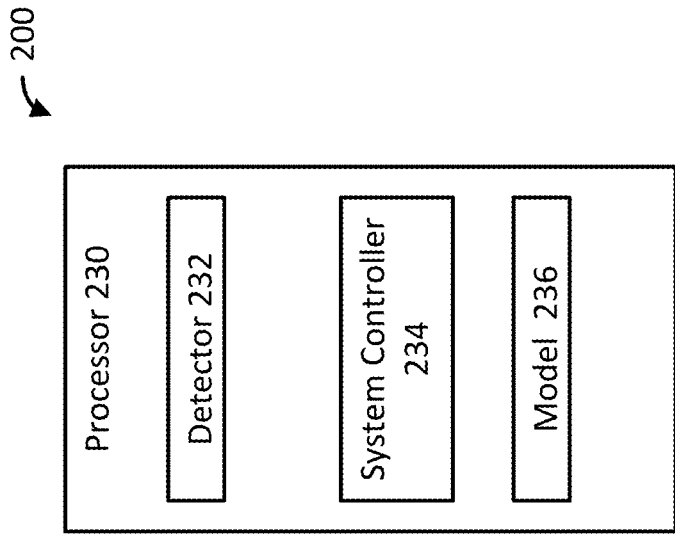
FIG. 2 is an example schematic illustration of a processor of a BOP control system, according to some embodiments.

FIG. 2 is a schematic illustration of a processor 230 included in a BOP system 200, according to some embodiments. The BOP system 200 can be substantially similar to the BOP system 100 of FIG. 1, and the processor 230 can be substantially similar to the processor 130 of FIG. 1, in structure and/or function. The processor 230 includes a detector 232, a system controller 234, and a model 236, as shown in FIG. 2. The detector 232 can be configured to receive information from a set of sensors (e.g., sensors 112 of the BOP system 100 in FIG. 1) and based on the information detect a state or stage associated with components, pathways, nodes, actuators and/or sensors of the BOP. For example, the detector 232 can receive information from a set of pressure sensors (or pressure transducers) placed at specified location on one or more functional pathways in a hydraulic manifold of a BOP and configured to sense back pressure in the hydraulic fluid used to actuate portions of the BOP. In some embodiments, the information received can include a local measurement of fluid pressure at a specific time point at the location of each pressure sensor. In some embodiments, the detector 232 can also receive from the from the set of pressure sensors, the BOP 210, and/or retrieved from a memory coupled to the processor 230, information related to the location and/or configuration of each pressure sensor on a manifold and/or a functional pathway of the BOP. Based on a measurement of fluid pressure from a pressure sensor PT1 and the information related to the location of PT1, the detector 232 can detect a state of actuation of a component and/or a stage of actuation of a BOP function. In some instances, the detector 232 can also receive, from the set of pressure sensors or any other portion of the BOP 210, an indication that an instruction was sent to actuate a particular component (e.g., a ram) adjacent to a specified pressure sensor. In some instances, based on the indication of instructions sent to actuate a component, and based on a measurement of pressure from a pressure sensor combined with a location of the pressure sensor the detector 232 can predict a change in pressure, obtain the measurement of pressure, compare the measured value and the predicted value, and determine a state of actuation and/or infer a stage of operation of the instructed BOP function and/or a likelihood of success of the BOP function. For example, the BOP system 200 can initiate an activation of a BOP function at a first time point. The detector 232 can receive information that the location of pressure sensor PT1 is proximal to an actuatable component (e.g., a ram) by a known displacement at the first time point. In some implementations, the detector 232 can receive information from the pressure sensor PT1 indicating a first measurement of pressure. The detector 232 can receive at a second time point, after a first time point of activation of a BOP function, a second measurement of pressure from the pressure transducer PT1. The detector 232 can determine based on the first measurement and the second measurement an increase in pressure (e.g., rise from 700 psi to 900 psi). Based on this determination the detector 232 can infer that given that the ram was activated at the first time point, the BOP function has reached a first stage of completion (e.g., a percentage movement, or a percentage completion of displacement or a percentage of completion of a range of travel associated with the ram) at the second time point.

In some embodiments, the detector 232 can receive information related to an expected amount of pressure to be associated with the actuation of a particular component, such as a ram of specified parameters, by a certain predetermined value. In some embodiments, the detector 232 can receive, for example from the model 236 (which is described in further detail below), an expected amount of pressure associated with a predefined movement of the particular ram. The detector 232 can then base on a comparison between the expected pressures to the actual pressure measured by one or more sensors in proximity to the ram, detect a state of movement of the ram. For example, the detector 232 can detect movement of the ram based on the actual measured pressure surpassing a threshold value based on the expected pressure. In some instances, the detector 232 can detect a rate of movement of the ram and/or a degree of movement or a percentage of movement. For example, the detector 232 can receive signals from a set of pressure sensors in proximity of a component such as a ram and based on the signals (e.g., a surge of pressure measured at a specified location, beyond a predefined threshold value, and/or at a particular point or window of time following the sending of instructions to actuate the ram) infer the completion of closure of the ram. Such a confirmatory inference of completion of BOP function can be highly valuable to avoid uncertainty of completion of critical operations (e.g., in avoiding a disastrous condition).

In some instances, the detector 232 can receive signals related to continuous changes in pressure associated with the movement of a ram and based on the changes in pressure detect a progression of closure (e.g., based on a plateau of pressure level), a completion of closure resulting in the two rams coming in contact (e.g., a surge in pressure to 1600 psi indicating full closure), a contact with a pipe (e.g., a surge in pressure when the ram is at a stage of partial closure), a shear of pipe (e.g., based on a surge in pressure followed by a reduction in pressure), a degree of shear of a pipe (e.g., based on a time profile of changes to pressure measured in proximity to the ram) and so on. In some instances, the detector 232 can be configured to received signals measuring the pressure levels from a set of sensors and detect leaks or state of maintenance of fluid pathways in a manifold associated with a BOP.

The system controller 234 can be configured to actuate one or more BOP functions (e.g., close a ram, shear a pipe, etc.) of a BOP 110. BOP functions may include any suitable function, such as, for example, a function associated with a ram, annular, accumulator, test valve, failsafe valve, kill and/or choke line and/or valve, riser joint, hydraulic connector, and/or the like (e.g., ram open, ram close, ram closure over pipe, ram closure to shear pipe, and/or the like).

In some embodiments, the system controller 234 is configured to actuate a BOP function at least in part, by communicating one or more commands to one or more nodes of a functional pathway associated with the BOP function and selected from one or more available functional pathways. A BOP, as described previously, can include a number of devices, such as, for example, rams, annulars, accumulators, test valves, failsafe valves, kill and/or choke lines and/or valves, riser joints, hydraulic connectors, and/or the like, many of which may be hydraulically actuated. As an example, rams, or ram blocks, can be of four common types: pipe, blind, shear, and blind shear. A ram included in a BOP can be similar in operation to a gate valve, but uses a pair of opposing steel plungers, rams. The rams extend toward the center of the wellbore to restrict flow or retract open in order to permit flow. In some embodiments, the inner and top faces of the rams are fitted with packers (elastomeric seals) that press against each other, against the wellbore, and around tubing running through the wellbore. Outlets at the sides of the BOP housing (body) are used for connection to choke and kill lines or valves.

In some embodiments, the system controller 234 can be configured to receive an indication, for example, from a user via a user interface, and based on the indication generate and send (e.g., to actuators) a first set of instructions to perform a BOP function. In some instances, the system controller 234 can receive information from the detector 232 related to a state of one or more components of a BOP and/or a stage of completion of one or more BOP functions. Based on the information the system controller 234 can infer a progression or condition of a component, pathway, actuator and/or sensor of the BOP. The system controller 234 can generate, based on the information from the detector 232 and/or the inference of the progression or condition, a second set of instructions related to the BOP function. For example, the system controller 234 can receive information from the detector 232 indicating a first measurement of pressure at a first time point before sending the first set of instructions to direct flow of pressurized fluid to a particular functional pathway to perform a BOP function. The system controller 234 can receive information indicating a second measurement of pressure at a second time point after sending the first set of instructions. The second measurement can be substantially higher than the first measurement and/or a threshold value. Based on the first measurement and the second measurement the system controller 234 can infer a progression (e.g., 75% completion) of the intended BOP function (e.g., a closure of a shear ram). The system controller 234 can generate a second set of instructions at the second time point and based on the inference such that the intended BOP function can be efficiently progressed further. For example, the system controller 234 can generate a second set of instructions at the second time point to reduce flow of pressurized fluid to the particular functional pathway such that the actuation of the component (e.g., shear ram) may be slowed down appropriately. In some implementations, the system controller 234 can generate a second set of instructions at the second time point to direct flow of pressurized fluid to another selected functional pathway such that an alternative BOP function can be performed.

In some embodiments, the system controller 234 can monitor and collect data from a set of sensors (e.g., pressure transducers) located at a set of locations proximal to a particular set of components to be actuated, for example a pair of rams. In some implementations, the system controller 234 can present the data collected from one or more sensors being monitored in the form of one or more plots. For example, the system controller 234 can plot changes in pressure sensed by a set of pressure transducers as plots to be displayed and/or analyzed further by the BOP control system 220. In some instances, the system controller 234 can obtain data from simulations (e.g., run by the model 236) and plot curves based on simulated data and/or real measured data and use the comparison for predicting a change of state of a component during actuation and/or a stage of completion of actuation of the component. The system controller 234 can run calibration cycles to calibrate the function of the one or more components of the BOP 210. The system controller 234 can use data gathered during calibration to generate expectations of behavior of the one or more components when actuated during testing (and/or during simulations). The system controller 234 can in an example use, send instructions to carry out the BOP function of actuating the rams to closure. The instructions can include for the closure of the particular ram can include instructions to a supply reservoir of high-pressure fluid to actuate one or more valves to open a first set of valves while closing a remaining set of valves such that pressurized hydraulic fluid is directed via specified functional pathways defined in a hydraulic manifold assembly to actuate the rams of interest. The system controller 234 can continue monitoring and measuring pressure levels proximal to the particular rams (e.g., a pair of rams) to collect information associated with a progression of the BOP function.

In some embodiments, the system controller 234 can be configured to instruct a set of hydraulic pumps associated with storage units of hydraulic fluid (operably coupled to and/or included in the BOP) such that the pressure of hydraulic fluid in the functional pathways associated with moving a particular pair of rams can be actively manipulated (i.e., hydraulic fluid can be actively pumped at any number of suitable subsequent time after the first time, such that pressure in the hydraulic fluid does not passively dissipate). In some embodiments, the system controller 234 can estimate an expected amount of pressure to be required to actuate a particular component, such as a ram of specified parameters, by a certain predetermined value. In some embodiments, the system controller 234 can receive, for example from the model 236, an expected amount of pressure associated with a predefined movement of the particular ram. In some instances, based on the expected amount of pressure required, the system controller 234 can actively and closely adjust the amount of hydraulic fluid pumped at a particular pressure, to avoid a dump of high-pressure fluid that has no recourse but to passively dissipate, and to avoid over supplying the pressure required to move a component and in the process inducing sub-optimal BOP function. For example, an over-supply of pressure can result in uncontrolled or less-controlled actuation of components, for example, supply of pressure past the full closure of rams resulting in increased wear and/or damage to contact edges of the rams. In some instances, the system controller 234 can be configured to actively control actuation of the one or more components (e.g., closure of rams) such that the BOP functions can be carried out in a more energy efficient manner and/or in a time efficient manner, compared to a passively mediated system of hydraulic actuations. The system controller 234 can further be configured to receive ongoing feedback from pressure sensors during the actuation of a component and actively compensate for any untoward change in pressure by instructing the pumping systems to pump fluid to meet a target pressure level.

The processor 230 includes a model 236 as shown in FIG. 2. The model can be any suitable mathematical model configured to simulate a hydraulic system to include and utilize pressure sensors and actuators associated with one or more components, and to allow calculation of expected values of variables related to actuation of components of the simulated system. The model 236 can be any suitable model (e.g., a statistical model, model based on physics of operations involved in a BOP, a kinematic model, a machine learning model, and/or the like). The model 236 can include model parameters that can be stored in a memory (not shown) associated with the processor 230 of the system 200. The model 236 can be configured to provide expected values of pressure levels of changes in pressure levels associated with specified BOP functions such as ram openings, ram closures, ram contact with a pipe, ram contact with a pipe given a location of the pipe, ram shear of a pipe, a degree of shear of a pipe, etc. In some embodiments, the model 236 can run simulations performing BOP functions in a simulated hydraulic system and generate a set of threshold values of pressure that can be used by the system controller 234 to evaluate pressure changes and/or changes in states and/or stages detected by the detector 232 and infer conditions or states of a BOP system. The model 236 can also be configured to provide expected values indicating a leak in one or more pathways associated with a BOP system.

Figure 3:
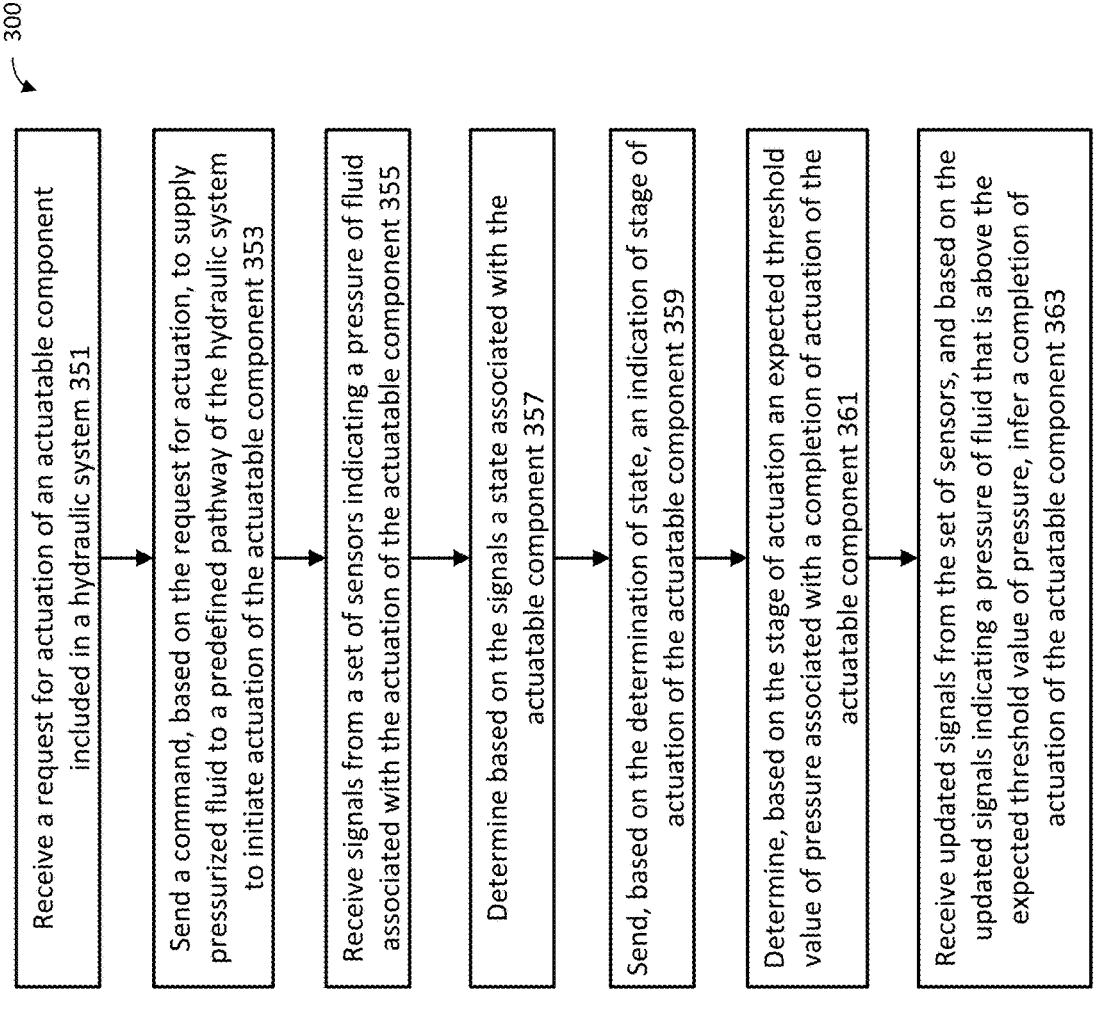
FIG. 3 is an example flowchart illustrating a method of operation of a BOP control system, according to some embodiments.

FIG. 3 is a flowchart of an example method 300 of performing a BOP function of actuating a component included in a BOP, according to an embodiment. The method 300 can be carried out by a BOP control system similar to any of the BOP control systems described herein (e.g., the BOP control system 100 and/or 200 described above). For example, the method 300 can be carried out by a processor (e.g., processor 130 and/or 230) described herein.

According to the example method 300, at 351 a processor receives a request for actuation of an actuatable component (also referred to herein as "component") included in a hydraulic system such as a BOP. For example, the processor can receive a user input or an automated programmed instruction requesting a closure of a ram included in a BOP.

At 353, the processor sends a command, based on the request for actuation, to supply pressurized fluid to a predefined pathway of the hydraulic system to initiate actuation of the component. For example, the processor sends a command to one or more actuators (e.g., valves) associated with a supply reservoir of a hydraulic power unit and functional pathways in a hydraulic manifold and/or one or more subsea pumps associated with storage units of pressured hydraulic fluid and/or functional pathways in the hydraulic manifold. The processor can send a command such that pressurized hydraulic fluid is released and/or pumped and directed along specified functional pathways to actuate a particular component.

At 355, the processor receives signals from a set of sensors (e.g., pressure transducers located along functional pathways of a manifold of the hydraulic system) indicating a pressure of fluid associated with the actuation of the component.

At 357, the processor can determine based on the signals a state associated with the component. For example, the processor can receive an indication of a relatively transient increase in pressure level (e.g., from 800 to 1000 psi) in proximity of the component indicating a state of initiation of movement and acceleration of the movement of the component.

At 359, the processor sends, based on the determination of state, an indication of stage of actuation of the component.

For example, in some instances, based on signals indicating changes in pressure measured proximal to a ram, the processor can send an indication of a partially completed stage of closure of the ram.

At 361, the processor can determine, based on the stage of actuation an expected threshold value of pressure associated with a completion of actuation of the component. For example, the processor can determine, using a model (e.g., model 236) an expected threshold value of pressure associated with completion of closure of a ram.

At 363, the processor receives updated signals from the set of sensors and based on the updated signals indicating a pressure of fluid that is above the expected threshold value of pressure, infers a completion of actuation of the component. In some instances, the updated signals can indicate a pressure that does not surpass the threshold value in which case the processor can infer and indicate an incomplete closure. In some instances, the processor can determine a first threshold value and a second threshold value such that the expected pressure associated with closure is predicted to be above the first threshold value and below the second threshold value. Based on the updated signals indicating the measured pressure to be above the first threshold value and below the second threshold value the processor can infer a safe completion of closure of the ram. Based on the updated signals indicating the measured pressure to be above the first threshold value and above the second threshold value the processor can infer a potential damage incurred in the completion of closure of the ram. In some instances, the processor can receive a time stamp associated with the signals. The processor can additionally determine an expected time stamp associated with a specified stage of the actuation. Based on a comparison and match of the time stamp of the signals and the expected time stamp the processor can infer a successful completion of closure. In some instances, based on a mismatch of the time stamp of the signals and the expected time stamp the processor can infer an obstruction (e.g., a pipe) encountered during partial completion of closure.

Figure 4:
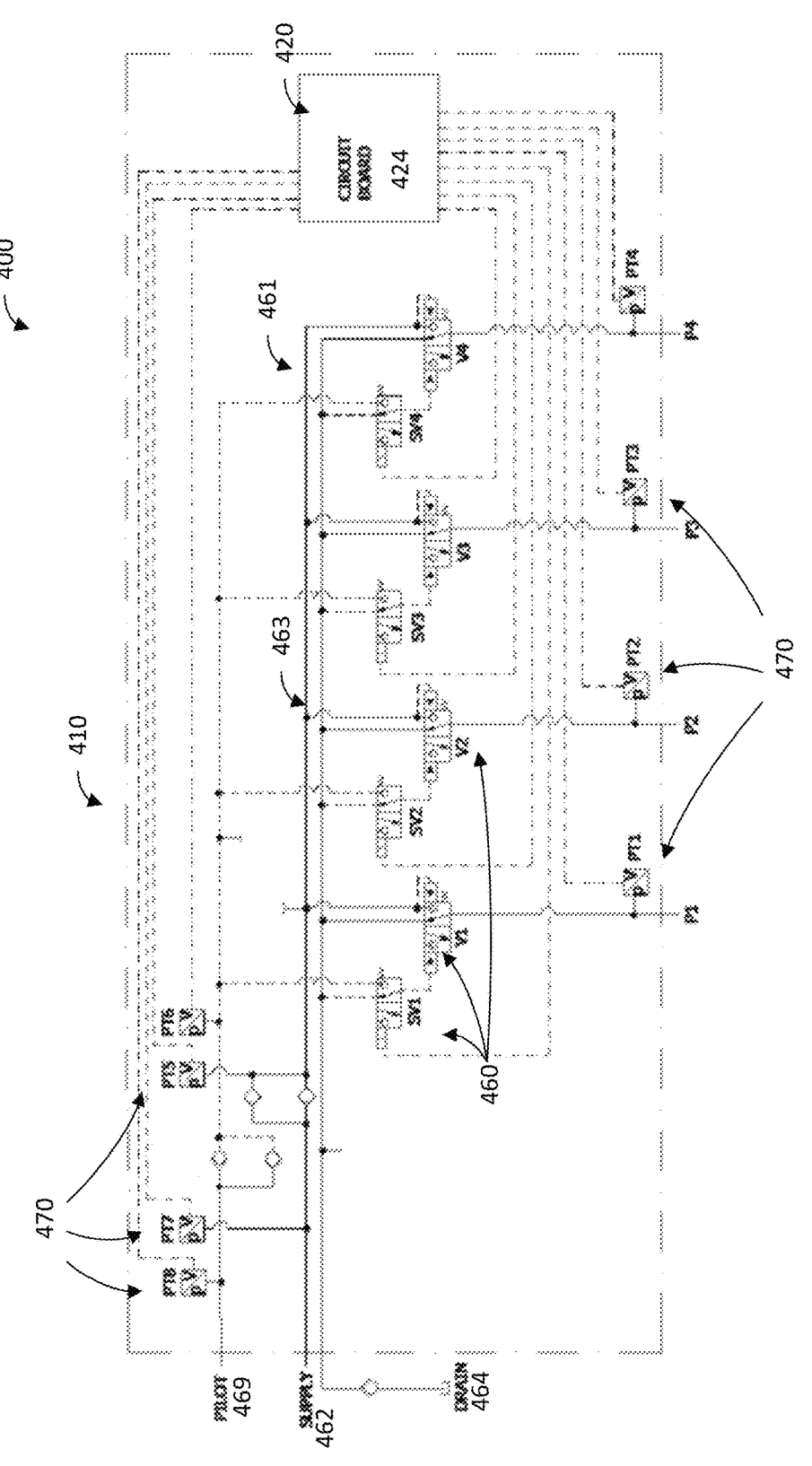
FIG. 4 is an example schematic illustration of an Integrated Manifold Assembly (IMA) associated with a BOP control system, according to some embodiments.

FIG. 4 is a schematic representation of an example manifold system operable with a BOP system 400, according to an embodiment. The BOP system 400 can be substantially similar in structure and/or in function to any of the BOP systems described herein (e.g., BOP systems 100, 200, 300, etc.). The BOP system 400 includes a BOP 410 and a BOP control system 420. The BOP 410 includes a hydraulic manifold (e.g., an integrated manifold assembly) 461 including a pilot line 469, a supply line 462, a drain line 464, and a network of functional pathways 463, as indicated in FIG. 4. The BOP 410 includes sensors 470 (e.g., pressure transducers PT1, PT2, . . . PT8) and actuators 460 (e.g., valves V1-V4, SV, etc.,) also shown in FIG. 4. As indicated in FIG. 4, in some implementations, some of the pressure transducers (e.g., PT6, PT8) can be placed at an upstream portion along the pilot line 469 and some of the pressure transducers (e.g., PT5, PT7) can be placed at a relatively upstream portion along the supply line 462 that is proximal to the supply of pressurized fluid. Some other pressure transducers (e.g., PT1, PT2, PT3, PT4) can be placed along a drain line 464 which can be associated with a relatively downstream portion of the supply line 462 that is distal to the supply of pressurized fluid. The BOP 410 includes a circuit board 424 that can include a BOP control system 420. The actuators 460 can be configured to be operated to direct pressurized fluid along specified functional pathways 463 defined by the lines of the hydraulic manifold. One or more components (not shown in FIG. 4) can be coupled to the functional pathways such that they can be actuated by activating one or more specified actuators from the actuators 460. Each of the actuators 460 can be activated by the circuit board 424. As shown, the hydraulic manifold can include strategic placement of pressure transducers PT1, PT2, . . . PT8) and actuators 460 (e.g., valves V1-V4, SV) at specified location along functional pathways 463 such that operation of each actuator from the actuators 460 can be known to cause an associated change in local pressure sensed by each sensor from the sensors 470.

In some implementations, the pressure transducers PT1, PT2, PT3, PT4 can be used to determine health on outlet drain lines 464 attached to the integrated manifold assembly (IMA). In some implementations, the pressure transducers PT5, PT6, PT7, and PT8 may be used to determine health of supply lines 462 attached to IMA, with PT5 and PT6 able to assist in determining health on outlet drain lines 464 when main stage valves are open. In some implementations, pressure transducers can be positioned and/or configured such that pressure can be measured before and after a set of main stage valves. In some such implementations, the positioning and/or configuration of one or more pressure transducers can be such that the data from the one or more pressure transducers can be used to perform prognostics or diagnostics related to performance of one or more valves associated with the pressure transducers. For example, in some implementations, the data from the one or more pressure transducers can be used to detect or predict leaks and/or a measure of change in flor across a valve.

Some example conditions that can be inferred from the information received from the sensors is shown in Table 1.

TABLE 1

| Sensor/Sensors | Component | Condition |
| --- | --- | --- |
| PT1 - F1 Port | IMA Discharge line | Leak on IMA discharge circuit Function 1 |
| PT2 - F2 Port | IMA Discharge line | Leak on IMA discharge circuit Function 2 |
| PT3 - F3 Port | IMA Discharge line | Leak on IMA discharge circuit Function 3 |
| PT4 - F4 Port | IMA Discharge line | Leak on IMA discharge circuit Function 4 |
| PT1 - F1 Port | IMA Discharge line | Leak on IMA discharge circuit Function 1 |
| PT2 - F2 Port | IMA Discharge line | Leak on IMA discharge circuit Function 2 |
| PT3 - F3 Port | IMA Discharge line | Leak on IMA discharge circuit Function 3 |
| PT4 - F4 Port | IMA Discharge line | Leak on IMA discharge circuit Function 4 |
| PT1 - F1 Port | IMA Supply Pressure | Supply pressure Function 1 |
| PT2 - F2 Port | IMA Supply Pressure | Supply pressure Function 2 |
| PT3 - F3 Port | IMA Supply Pressure | Supply pressure Function 3 |
| PT4 - F4 Port | IMA Supply Pressure | Supply pressure Function 4 |
| PT1 - F1 Port | IMA Supply Pressure | Supply pressure Function 1 |
| PT2 - F2 Port | IMA Supply Pressure | Supply pressure Function 2 |
| PT3 - F3 Port | IMA Supply Pressure | Supply pressure Function 3 |
| PT4 - F4 Port | IMA Supply Pressure | Supply pressure Function 4 |

Figure 5:
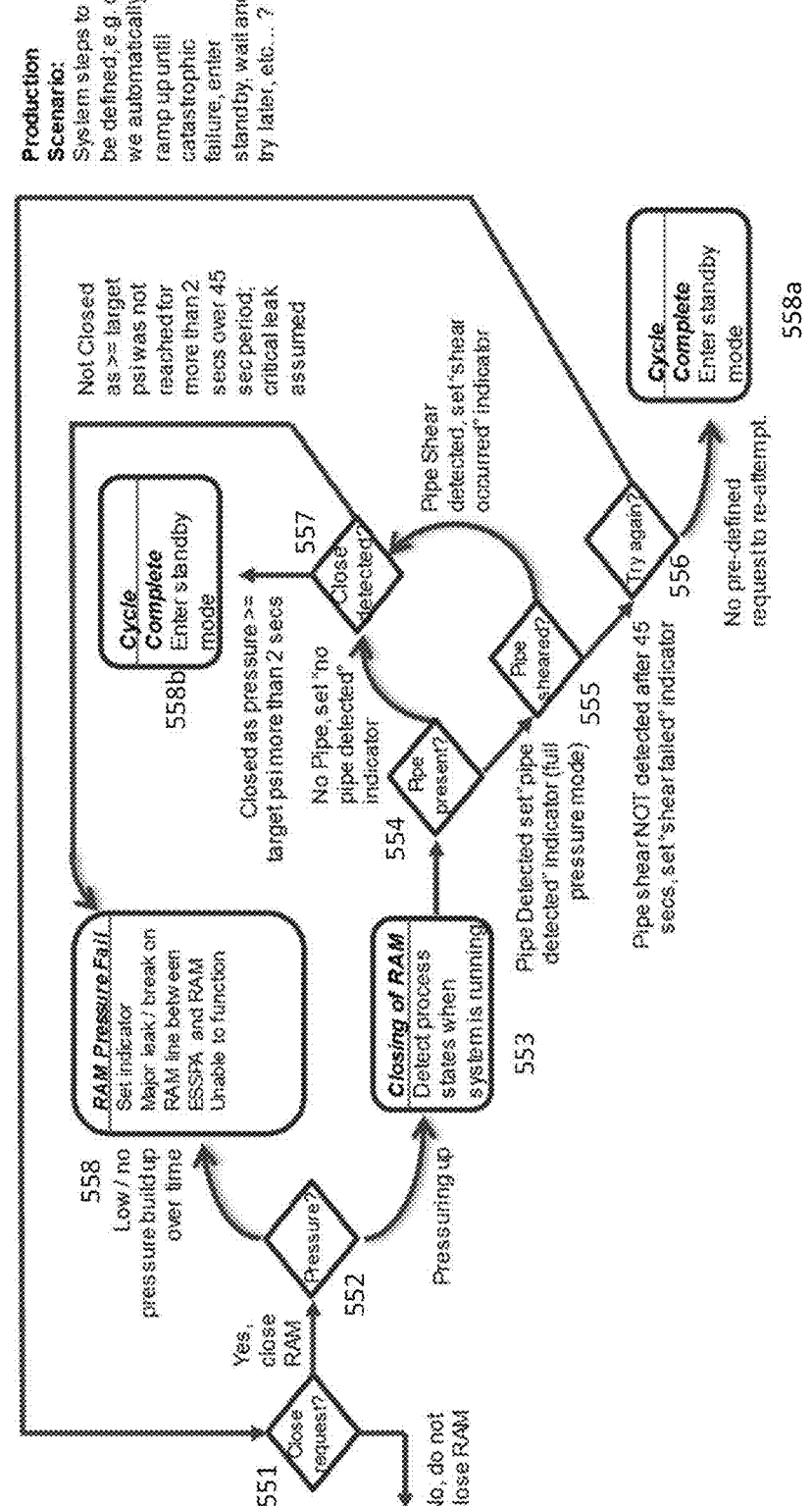
FIG. 5 is an example flowchart a method of operation of a BOP control system, according to some embodiments.

FIG. 5 is an example flowchart of a method 500 of an operation involving a BOP function, conducted by a BOP system, according to an embodiment. In the method 500, a close request is received to close a RAM. A processor (e.g., processors 130, and/or 230 described previously) associated with a BOP control system can evaluate, at 551, whether a close request is received, and when the close request is confirmed to be received the processor evaluates at 552, whether a suitable increase in pressure is measured by a set of sensors in proximity to the ram that is to be actuated following the BOP being instructed to be pressurized.

In some implementations, the processor can receive a command indicating affirmatively to ramp pressure up and in response to the command, the system can pressure up leading to closing of the ram at 553.

As described previously, the processor can receive signals from a set of sensors during the ramping of pressure leading to closure of the ram such that the state of the ram and the stage of closure can be monitored. In some embodiments, the system can also receive and/or generate a set of threshold values that can be used to determine a set of states or conditions associated with actuation of a ram. For example, a first threshold value can be used to determine if there was a pipe present, a second threshold value can be used to determine shearing of the pipe if it was present. A third threshold value can be used to determine degree of shear, and so on.

At 554 the system can evaluate if the measured pressure at a particular point of time (e.g., time after initiation of actuation) is above the first expected threshold pressure value and based on a positive result indicate a detected presence of pipe (e.g., detected by a detector such as detector 232). If no pressure above the first threshold is detected at a particular time point, the system can indicate an absence of pipe at 554. At 557 the system can evaluate if a final threshold value of pressure is met for a substantial amount of time (e.g., the measured pressure is greater or equal to the final threshold pressure value for more than 2 seconds). Once this condition is met, at 557, the system can infer a detection of a closed state of the ram and indicate as such. The system can then enter a standby mode at 558*b* having completed that cycle of performing the BOP function.

In some implementations, having detected a pipe at 554, at 555 the system can evaluate if the measured pressure at a particular point of time (e.g., time after detection of a presence of a pipe) is above the second expected threshold pressure value and based on positive results indicate a shearing of pipe. Having indicated a shearing of pipe, the system can evaluate if the final threshold condition is met, as described above (e.g., pressure equal to or greater than the final threshold value for more than 2 seconds) and based on the comparison indicate a closure detected at 557. The system can then enter standby mode at 558*b* having completed the cycle performing the BOP function. If the closure is not detected at 557 the system can set an indicator (e.g., indicating a major leak at a particular location) which can be used to further examine and/or repair the BOP system.

In some implementations, having evaluated for a shear in the pipe at 555, the system can compare measured pressure against a third threshold value and, based on the pressure not crossing the threshold value, infer that no shear has occurred. For example, the measured pressure not crossing the third threshold value within a predefined time window of 45 sec. The system can then set a flag to indicate a failure of shear. As shown in flowchart in FIG. 5, the system can try a new attempt at shearing the pipe in which case the process can begin at 551 obtaining a close request. Alternatively, in some instances, the system can enter a standby mode at 558 having completed a cycle of performing a BOP function.

In some implementations, the processor can receive a signal from a set of sensors (e.g., pressure sensors) at 552 indicating that the pressure measured proximal to the actuated component is insufficient (e.g., below a threshold value of expected pressure). Based on the signal of insufficient pressure at 558 the system can register a pressure failure mode. The system can include one or more indicators, which can be set to indicate the failure mode. The insufficient pressure can be caused by a major leak or break on the functional pathways leading up to the ram to be actuated (i.e., between the BOP control system, also referred to as the "Emergency Subsea Pressure Assembly", and the ram). The indicator can be set to flag the location of pressure sensors where the insufficient pressure was registered so that the location can be flagged for further examination at 558.

Figures 6A, 6B:
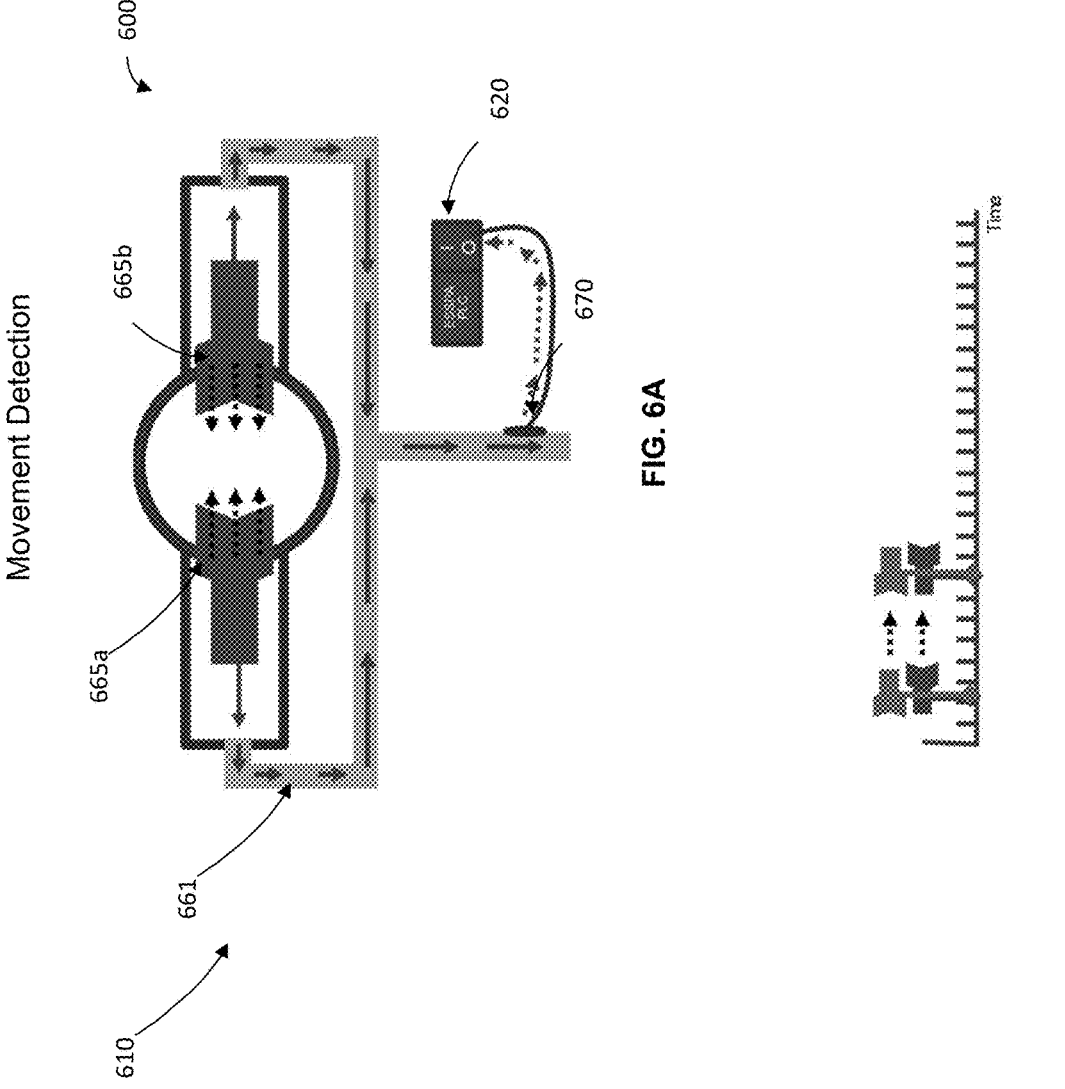
FIG. 6A is a schematic illustration of an example pair of rams at an open state and being manipulated towards a closed state by a BOP control system, according to some embodiments.
FIG. 6B is a schematic illustration of a timeline associated with the manipulation of the rams of FIG. 6A.

FIG. 6A is a schematic illustration of a portion of a BOP system 600, with a movement detection during an example BOP function of ram closure, according to an embodiment. The BOP system 600 includes the rams 665a and 665b being actuated by supply of pressured hydraulic fluid indicated by the arrows of fluid flow within the functional pathways 661 of the BOP 610. The BOP system 600 further includes a pressure sensor 670 in operable or fluid communication with the functional pathway 661. Actuation is controlled by the BOP control system 620 and the BOP control system 620 receives signal from the pressure sensor 670, which can be used to detect a state of the rams 665a and 665b. In this example, the rams 665a and 665b are detected to be moving as indicated by the black arrows pointing in the direction of ram movement. FIG. 6B is a schematic illustration of a timeline of movement detected including a starting point and an ending point. In some embodiments, the system 600 can be configured to model the movement of ram 665a and 665b to generate simulated measurements of expected threshold values of pressure that can be sensed by the pressure sensor 670 at specific threshold values or windows of time (e.g., upper, and lower limit of time with respect to an event such as initiation of actuation, detection of initiation of actuation from a first surge in pressure, etc.). The system 600 can use the modeled results to set predicted threshold values to be used for evaluated during a BOP function.

Figures 7A, 7B:
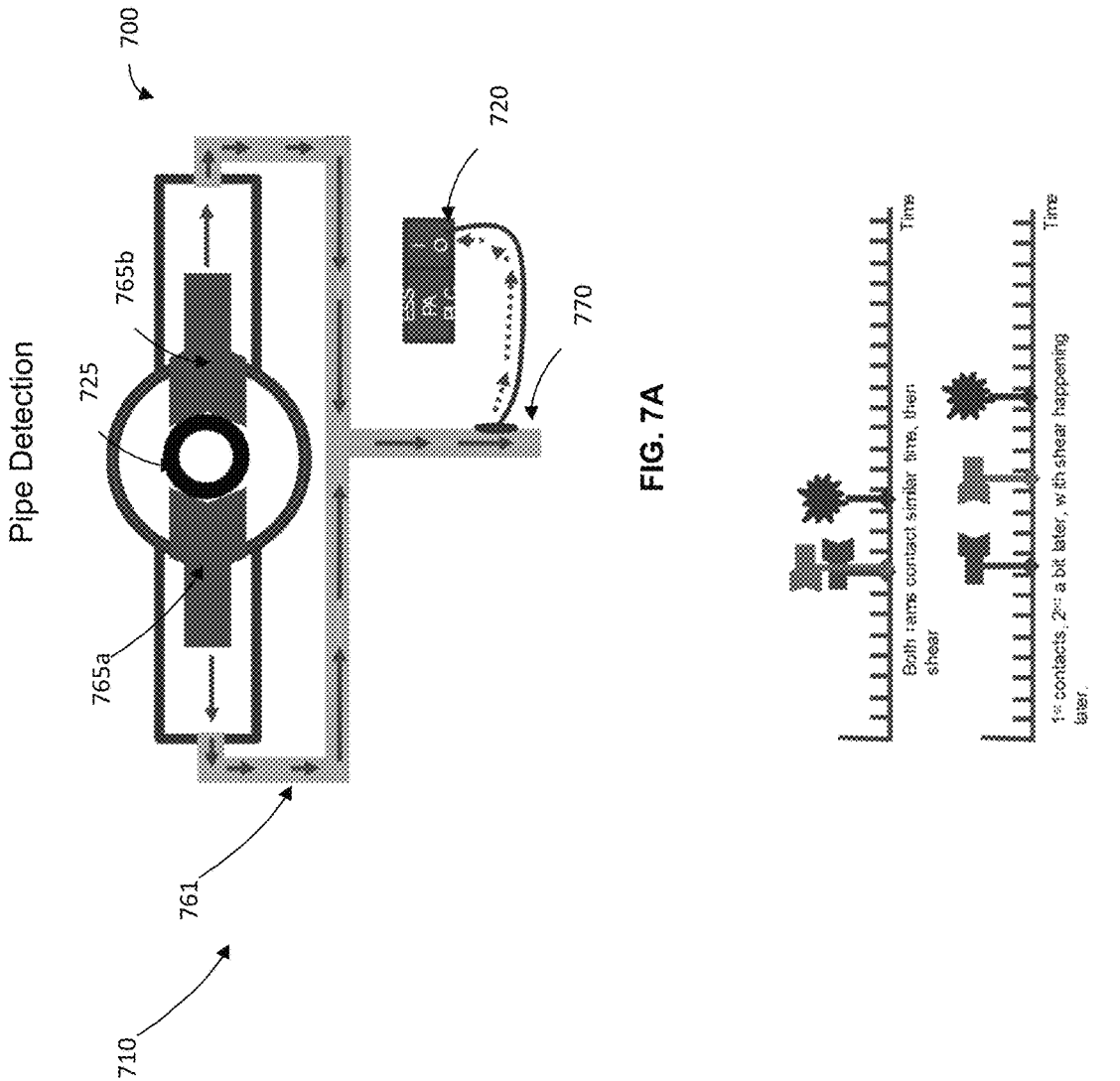
FIG. 7A is a schematic illustration of an example pair of rams at first state of no contact with a pipe and being manipulated towards a second state of contact with the pipe by a BOP control system, according to some embodiments.
FIG. 7B is a schematic illustration of two example timelines associated with the manipulation of the rams of FIG. 7A.

FIG. 7A is a schematic illustration of a portion of a BOP system 700, with a pipe detection during an example BOP function of ram closure, according to an embodiment. The BOP system 700 includes the rams 765a and 765b being actuated by supply of pressured hydraulic fluid indicated by the arrows of fluid flow within the functional pathways 761 of the BOP 720, the functional pathway 761 including a pressure sensor 770. The actuation is controlled by the BOP control system 720 and the BOP control system 720 receives signal from the pressure sensor 770, which can be used to detect a state of the rams 765a and 765b, and/or the presence of pipe 725. For example, the BOP control system 720 can receive an indication of a first measurement of pressure at a first time point before the actuation of the rams 765a and 765b. The first measurement of pressure at the first time can be associated with an initiation of movement of the rams 765a and 765b, each ram overcoming stiction and beginning to move. The BOP control system 720 can receive an indication of a second measurement of pressure at a second time point after the first time point and following the actuation of the rams 765a and 765b, the second measurement indicating a reduced pressure compared to the first measurement that can be inferred to be associated with a movement of the rams 765a and 765b. The BOP control system 720 can receive an indication of a third measurement of pressure at a third time point after the second time point and following the inferred movement of the rams 765a and 765b, the third measurement indicating an increased pressure compared to the second measurement. The increased pressure compared to the second measurement can be inferred to be a resistance to the movement of the rams 765a and/or 765b, based on the placement of the pressure sensors 770 and/or the associated functional pathways. In some implementations, the BOP control system 720 can infer, based on the time elapsed between the third time point and the second time point, the expected degree or range of movement of the rams 765a and 765b. The increased pressure and the inferred degree or range of movement can be used to determine if completion of the movement of the rams 765a and 765b has occurred. For example, in some instances, an increased pressure at the third measurement associated with an expected full range of movement of the rams can be used to infer contact between the rams 765a and 765b upon closure thus indicating a successful completion of the BOP function. The increase in pressure at the third measurement can be associated with each ram completing its travel and hitting a dead stop.

The BOP control system 720 can receive additional information related to calibration of movement of each ram, function of pumps, timing of actuation of one or more actuators, etc. For example, the BOP control system 720 can calibrate primary "movement" variables when pump(s) are active. The BOP control system 720 can also receive information related to stipulations of when movement should be sensed with respect to an initiation command to indicate proper functioning (e.g., movement sensed within a period of time less than 45 seconds). In some instances, the BOP control system 720 can display one or more values associated with the sensed pressures (e.g., plot as a function of time) related to each ram.

In some implementations, an increased pressure at the third measurement associated with an incomplete range of movement of the rams 765a and 765b can be used to infer a presence of a pipe and the increase in pressure can be inferred to be a result of the rams 765a and 765b contacting the pipe. In some implementations, the BOP system 700 can be tested with pipe placement at various locations such that the difference in pressures at varying time intervals sensed by each ram of the rams 765a and 765b can be used to infer a precise pipe position (e.g., no-pipe present, pipe centered within the BOP, strapped to the BOP wall at 12 o'clock position, at the 3 o'clock, etc.,).

In some implementations, the BOP control system 720 can receive an indication of a third measurement of pressure at a third time point after the second time point and following the inferred movement of the rams 765a and 765b, the third measurement being associated with the movement of the ram 765a. The BOP control system 720 can receive an indication of a fourth measurement of pressure at a fourth time point after the second time point and the third time-point, the fourth measurement indicating an increased pressure compared to the second measurement, and the fourth measurement being associated with the movement of the ram 765b. The third time point and the fourth time point can be different from each other indicating a contact between the ram 765a and the pipe, and contact between the ram 765b and the pipe, at different times, respectively. The BOP control system 720 can compute a difference between the third time point and the fourth time point and infer a relative placement of the pipe in relation to the rams 765a and 765b (before actuation) and/or the well.

In some embodiments, the system 700 can be configured to model the movement of the rams 765a and 765b and a contact with pipe 725. The system can then use the results from the simulations of the model to generate expected threshold values of pressure and/or expected threshold time windows when the pressure is expected to be at the threshold value. The expected threshold values can then be used to evaluate BOP function during a cycle. In some embodiments the system can predict potential scenarios that can be encountered and populate a set of threshold pressure values associated with each expected scenario. Using the set of threshold values each scenario in a real run of the BOP 700 can be evaluated against a simulated run. In some embodiments, the system 700 can be calibrated under different known scenarios, for example under known absence of pipe and/or known presence of pipe of a known specification and/or location (e.g., centered, at a bottom position, at a 3-o'clock position, etc.), and associated changes in pressure encountered during calibration runs can be recorded for reference. The recorded values and signals can be compared against measurements and plots generated during a real run of the BOP system 700 during testing. In the example, the rams 765a and 765b are detected to have contacted the pipe 725 and detected the presence of the pipe 725. FIG. 7B is a schematic illustration of two example timelines of movement and contact with pipe detected at two example scenarios. The first timeline illustrated a starting point of initiation of movement of each ram and a time point at which contact with the pipe was made. In some instances, the pipe can be off centered as in the scenario of the second timeline, indicated by asymmetric time points of contact by each ram, and a delayed shear resulting from the contact. Based on the relative difference in time points between the contact of the first ram 765a and the contact of the second ram 765b with the pipe 725, a relative location of the pipe can be inferred. For example, given the difference in time point of contact of a significant factor the pipe 725 can be inferred to be off center by a degree related to the factor of difference in time points of contact.

Figures 8A, 8B:
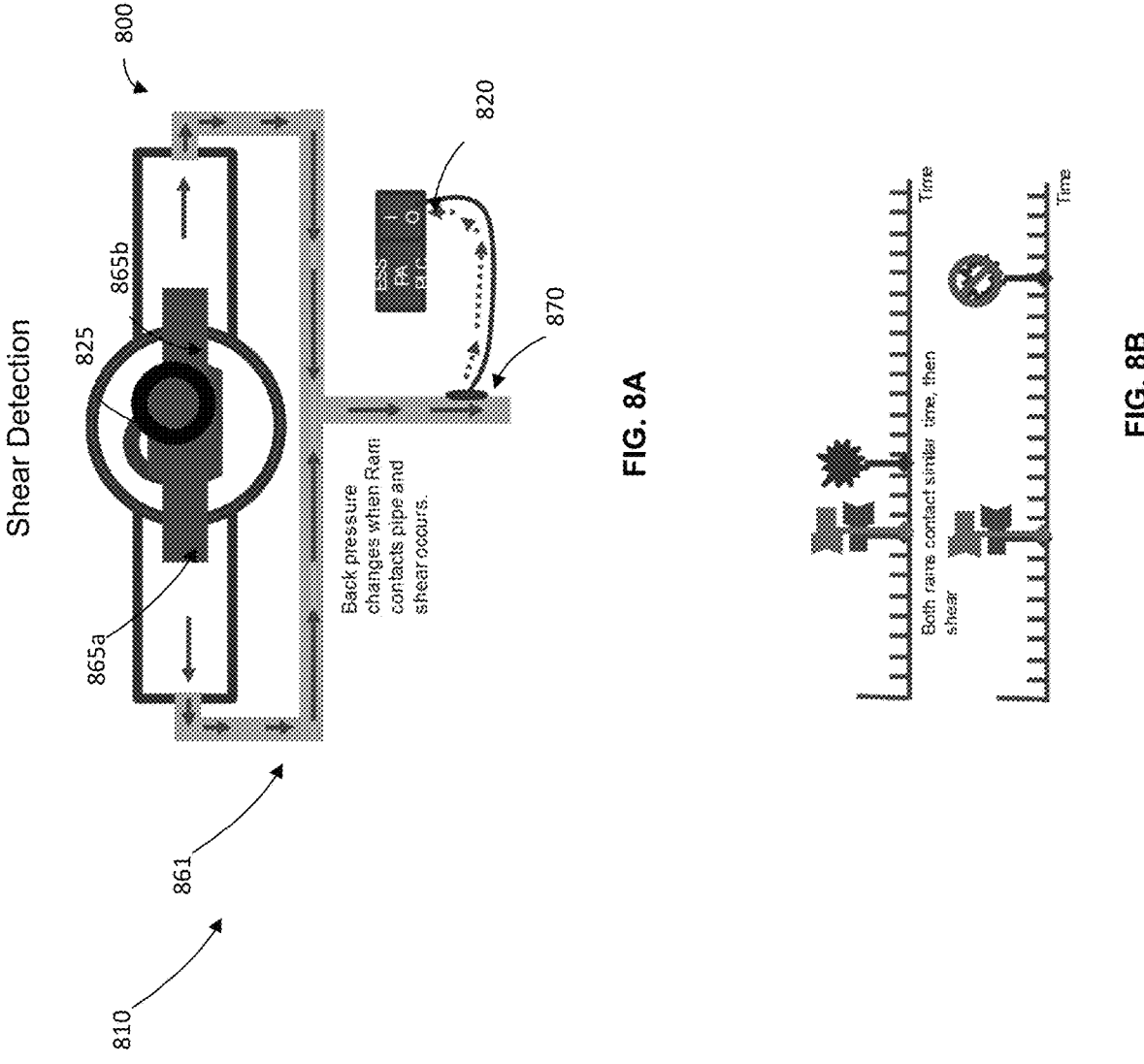
FIG. 8A is a schematic illustration of an example pair of rams configured to shear a pipe at first state with respect to a pipe and being manipulated towards a second state with respect to the pipe by a BOP control system, according to some embodiments.
FIG. 8B is a schematic illustration of two example time-lines associated with the manipulation of the rams of FIG. 8A under two example scenarios.

FIG. 8A is a schematic illustration of a portion of a BOP system 800, with a pipe shear detection during an example BOP function of ram closure, according to an embodiment. The BOP system 800 includes the rams 865a and 865b being actuated by supply of pressured hydraulic fluid indicated by the arrows of fluid flow within the functional pathways 861 of the BOP 820, the functional pathway 861 including a pressure sensor 870. The actuation is controlled by the BOP control system 820 and the BOP control system 820 receives signal from the pressure sensor 870 which can be used to detect a state of contact with the pipe 825 by the rams 865a and 865b, and the state of shear of the pipe 825 as the rams are advanced after the point of contact. As described above with reference to the BOP system 700, the BOP system 800 can calibrate during controlled test runs, one or more primary variables associated with ram closure when it is known that pipe is not present, and when it is known that a pipe of a known specification is placed at a known position. This information can be used to establish allowable windows for values of variables, For example, this information can be used to determine expected ranges associated with time intervals that are typically required to close the rams, as well as expected ranges associated with "no-pipe in BOP" pressure curves.

The BOP control system 820 can receive an indication of a first measurement of pressure at a first time point before the actuation of the rams 865a and 865b. The BOP control system 820 can receive an indication of a second measurement of pressure at a second time point after the first time point and following the actuation of the rams 865a and 865b, the second measurement indicating a reduced pressure compared to the first measurement that can be inferred to be associated with a movement of the rams 865a and 865b. The BOP control system 820 can receive an indication of a third measurement of pressure at a third time point after the second time point and following the inferred movement of the rams 865a and 865b, the third measurement indicating an increased pressure compared to the second measurement. The increased pressure compared to the second measurement can be inferred to be a resistance to the movement of the rams 865a and/or 865b, based on the placement of the pressure sensors 870 and/or the associated functional pathways 861. The inferred resistance can be from the rams 865a and/or 865b contacting a pipe, as described above with reference to the BOP 710 of the BOP system 700. The BOP control system 820 can receive an indication of a fourth measurement of pressure at a fourth time point after the third time point and following the inferred contact of the rams 865a and/or 865b with a pipe, the fourth measurement indicating a decreased pressure compared to the third measurement. The decreased pressure compared to the third measurement can be inferred to be a release in resistance to the movement of the rams 865a and/or 865b, from shearing of the pipe that was in contact with one or both of the rams 865a and/or 865b. The inference of degree of shear of the pipe can be made based on the amount of decrease in pressure, the rate of decrease in pressure and/or the relative amounts of decrease sensed by various pressure sensors 870, based on placement of the pressure sensors 870 and/or the associated functional pathways 861.

In some implementations, the BOP control system 820 can infer, based on the time elapsed between the fourth time point, the third time point and/or the second time point, expected degree or range of movement of the rams 865a and/or 865b. In some implementations, a further increase in pressure sensed at a fifth time point after the fourth timepoint associated with an inference of a successful shearing of a pipe can be used to infer that a completion of the movement of the rams 865a and 865b has occurred. For example, in some instances, an increased pressure at the fifth measurement at the fifth time point and associated with an expected full range of movement of the rams 865a and 865b can be used to infer contact between the rams 865a and 865b upon closure, after shearing the pipe, thus indicating a successful completion of the BOP function.

In some instances, the BOP system 800 can be configured to detect a successful shear event as well as an unsuccessful shear event. For example, if a high pressure is detected for a sustained period of time without a reduction in resistance (e.g., pressures greater than 5,000 psi and lasting for 5 seconds and/or 45 seconds has elapsed for shear to occur), the BOP system 800 may infer an unsuccessful shear event. Under some circumstances, the BOP system 800 can be used to perform a no-shear event at the discretion of a user and/or a supervisory program management. In some implementations, the BOP system 800 may be configured such that it may be assumed that if a shear event was not detected, then the no-shear flag may be set.

In some embodiments, the system 800 can be configured to model the movement of the rams 865a and 865b, a contact of each ram with pipe 825, and the advancement of each ram to shear the pipe 825. The system can then use the results from the simulations of the model to generate expected threshold values of pressure and/or expected threshold time windows when the pressure is expected to be at the threshold value. The expected threshold values can then be used to evaluate BOP function during a cycle. In the example, the rams 865a and 865b are detected to have contacted the pipe 825 and sheared the pipe 825 by a specified degree. FIG. 8B is a schematic illustration of two example timelines of two example scenarios including a successful shear detected and an unsuccessful shear respectively. In the first timeline, indicators show a starting point of initiation of movement of each ram, a time point at which contact with the pipe was made for each ram, at the same time, and a shear of the pipe following the point of contact. As shown in the second timeline, in some instances, no increase in pressure is indicated at the expected threshold time window is detected. Instead, a delayed increase in pressure indicates a failure to shear the pipe. Based on the relative difference in time points between the contact of the first ram 765a with the pipe 725, the contact of the second ram 765b with the pipe 725, and the surge in pressure at a delayed time point, a relative degree of partial shear of the pipe can be inferred.

In some implementations, as described previously, the lack of adequate build up in pressure associated with the fluid at a particular location proximal to the actuation of a component can be indicative of a leak. The information from the sensors can be used to estimate the size and/or rate of leak, and/or the location of leak. In some embodiments, pressure sensors can be distributed along the hydraulic manifold of a BOP with the placement of each pressure sensors at a strategic location such that the lines of hydraulic fluid flow can be monitored for use and/or wear and maintained appropriately. For example, referring to the schematic of FIG. 4 of the system 400, the pressure sensors PT1, PT2, PT3 and PT4 may be used to determine a condition of the outlet lines attached to the manifold 461 (IMA). Pressure sensors PT5, PT6, PT7, and PT8 may be used to determine health of supply lines attached to the manifold 461 (IMA), with PT5 and PT6 configured to assist in determining health on outlet lines when main stage valves (e.g., V1, V2, V3, V4 indicated in FIG. 4) are open.

In some implementations, when a BOP system is in steady state operation and when pumps are off, leaks in a reservoir supply circuit can be detected if there is a change in pressure level over time. Rate of change of pressure registered can be calculated by the BOP control system to determine a rate of leak. The BOP system can implement a system of compensation of pressure by supplying additional fluid for example by pumping fluid, can flag or indicate a state of leak and a state of compensation (e.g., refill reservoir alarm) or if rate of leak is severe, a repair alarm can be set.

In some implementations, the signals from the pressure sensors can be used to monitor and indicate proper function of the components such as pumps, valves, motors, etc., of the BOP. For example, in case of a valve, when open, a line pressure and a supply pressure associated with the valve is expected to equalize. Thus, in some instances, for example, when a detectable change is observed to flag a failure to equalize such a flag can be an indication that the valve is not functioning as required.

In some implementations, operation of a BOP system can be virtually simulated (e.g., using a model such as model 236 of system 200) such that one or more variables of hydraulic fluid flow can be calculated. For example, a flow rate and/or a flow volume can be calculated given parameters associated with the flow pathways. A volume displacement of fluid can be calculated based on pump speed and other parameters associated with the pumping of fluid.

FIG. 9 is a table 900 that shows example calculations of run time values of speed of actuation, a percentage completion of a BOP function (e.g., closure of a ram), a volume of fluid displaced in gallons per minute (GPM), and a rate of displacement of fluid in gallons per second (GPS) as carried out by a BOP system, according to some embodiments.

Figure 10B:
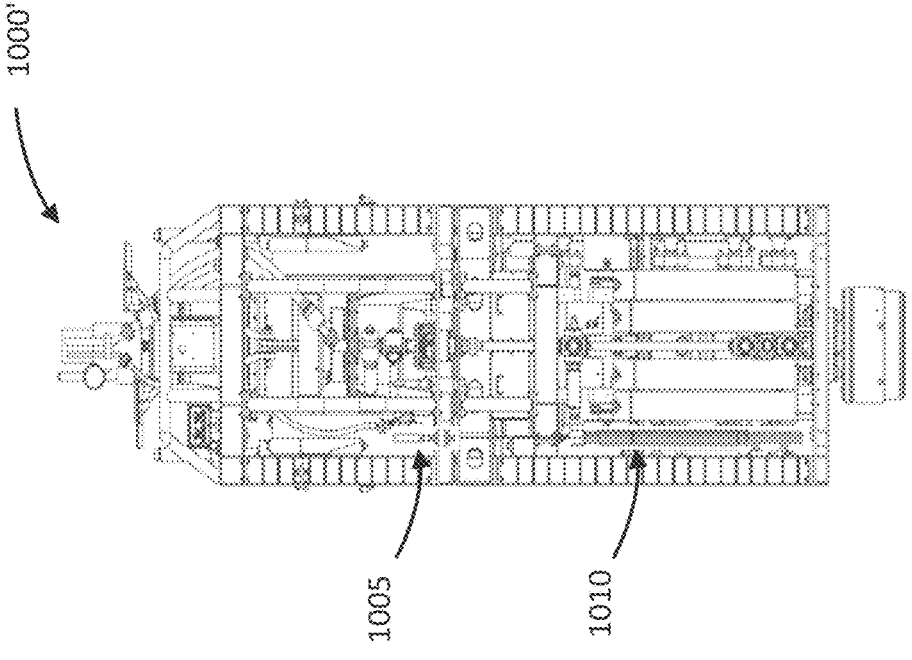
FIG. 10B is a schematic representation of an example implementation of the BOP system of FIG. 10A.
Figure 10A:
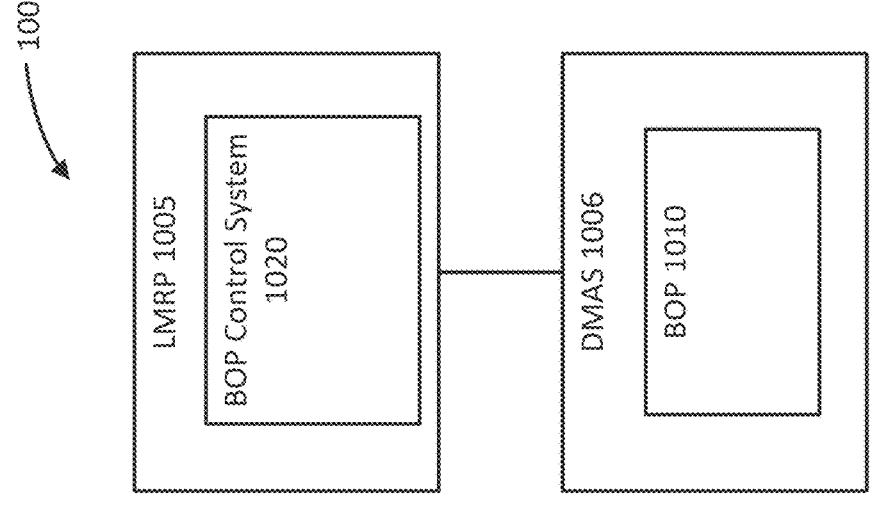
FIG. 10A is a block diagram illustrating an example implementation of a BOP system, according to some embodiments.

FIG. 10A is a block diagram illustrating an example implementation of a BOP system 1000, according to an embodiment. FIG. 10B is a schematic representation of an example implementation 1000' of the BOP system 1000. The BOP system 1000 can be substantially similar in structure and/or function to any of the BOP systems described herein, e.g., the BOP systems 100, 200, 600, 700, and/or 800, and can be operated accordingly to any suitable methods described herein (e.g., methods 300, 500, etc.). As shown in FIG. 10A, the BOP control system 1020 of the BOP system 1000 is included in a Lower Marine Riser Package (LMRP) 1005 and the BOP 1010 can be a subsea BOP. The LMRP 1005 can include a connector to a well (e.g., a subsea oil well, not shown), other systems of control (e.g., a series of safety valves, not shown), and a connection at the top (not shown) for connection to a riser pipe that provides an extension of a well to a surface drilling facility. The riser pipe can include a large diameter, low pressure main conduit with external auxiliary lines that include high pressure choke and kill lines for circulating fluids to the subsea BOP, and potentially other power, data, and/or control lines for the BOP. As shown in FIG. 10A, the BOP 1010 is integrated in a Deadman Autoshear (DMAS) system 1006. The DMAS system 1006 can be configured to, when armed, automatically "close-in" the well in the event of total loss of hydraulic supply and pilot or control signals with the BOP control system 1020. It can also be configured to "close-in" the well in the case of an unplanned disconnect with the LMRP 1005 from the BOP Stack (not shown).

Figure 11:
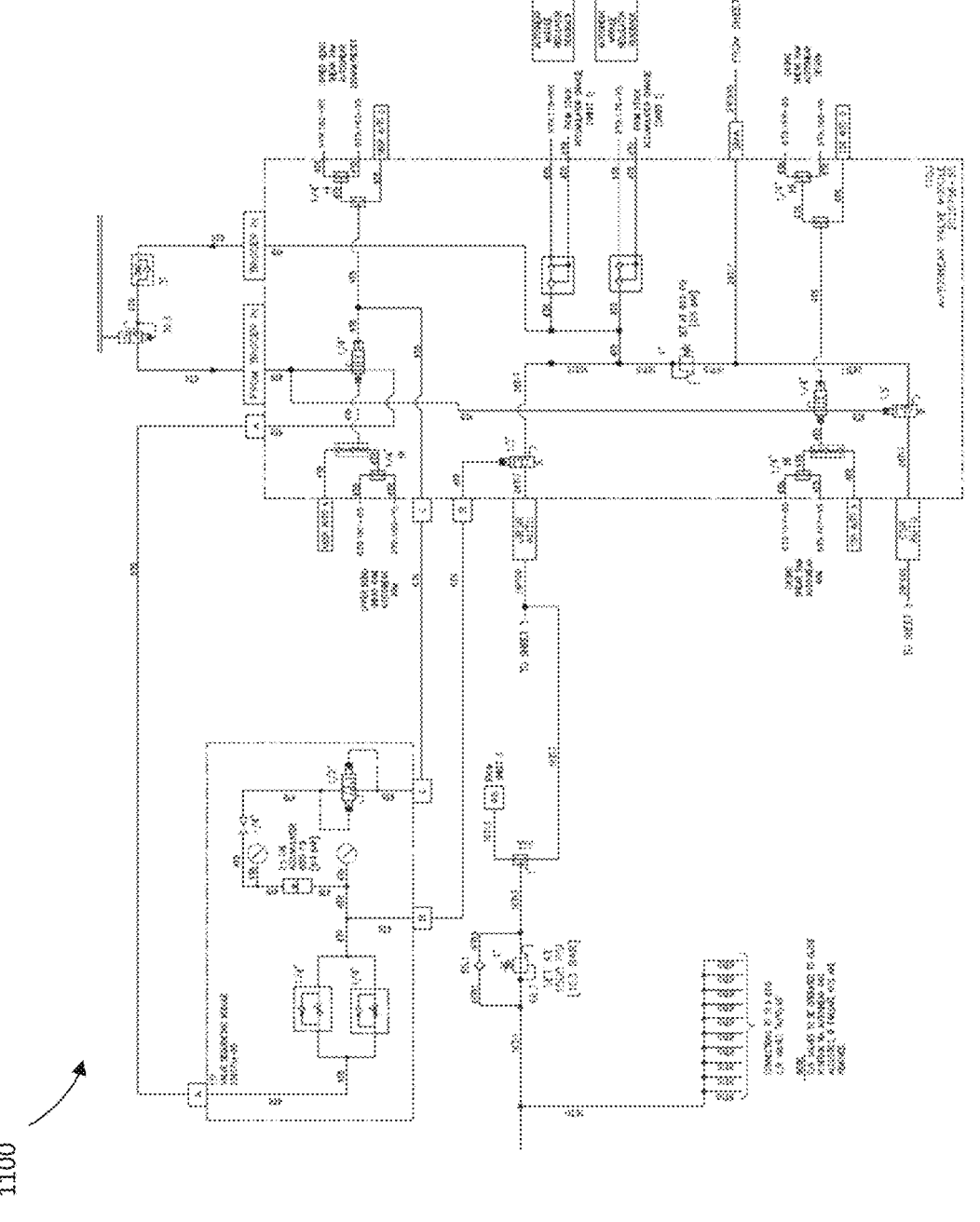
FIG. 11 is a schematic representation of an example implementation of a BOP system, according to some embodiments.

FIG. 11 is a schematic representation of an example implementation of a BOP system 1100, according to an embodiment. The BOP system 1100 can be substantially similar in structure and/or function to any of the BOP systems described herein (e.g., BOP System 100, 200, 600, 700, 800, and/or 1000, and can be operated accordingly to methods 300, and/or 500). The BOP system 1100 includes a BOP control system 1120 and a BOP 1110 integrated into a DMAS system 1106. In some implementations, the BOP system 1100 can use pressure transducers to monitor operation modes being used. For example, based on data from one or more pressure transducers implemented in one or more functional pathways, a BOP control system associated with the BOP system 110 can be configured to identify that the BOP system 110 is operating at a nominal mode. In some implementations, the BOP system 1100 can collect information related to a current state of a component such as a casing shear ram (CSR), a blind shear ram (BSR), etc., and any acoustic arm/disarm states associated with each component. Based on this information, the BOP control system can manage (e.g., via a Safety controller) hydraulic functions of the BOP system 1100 in a manner described by the nominal control systems' operational requirements.

Figure 12:
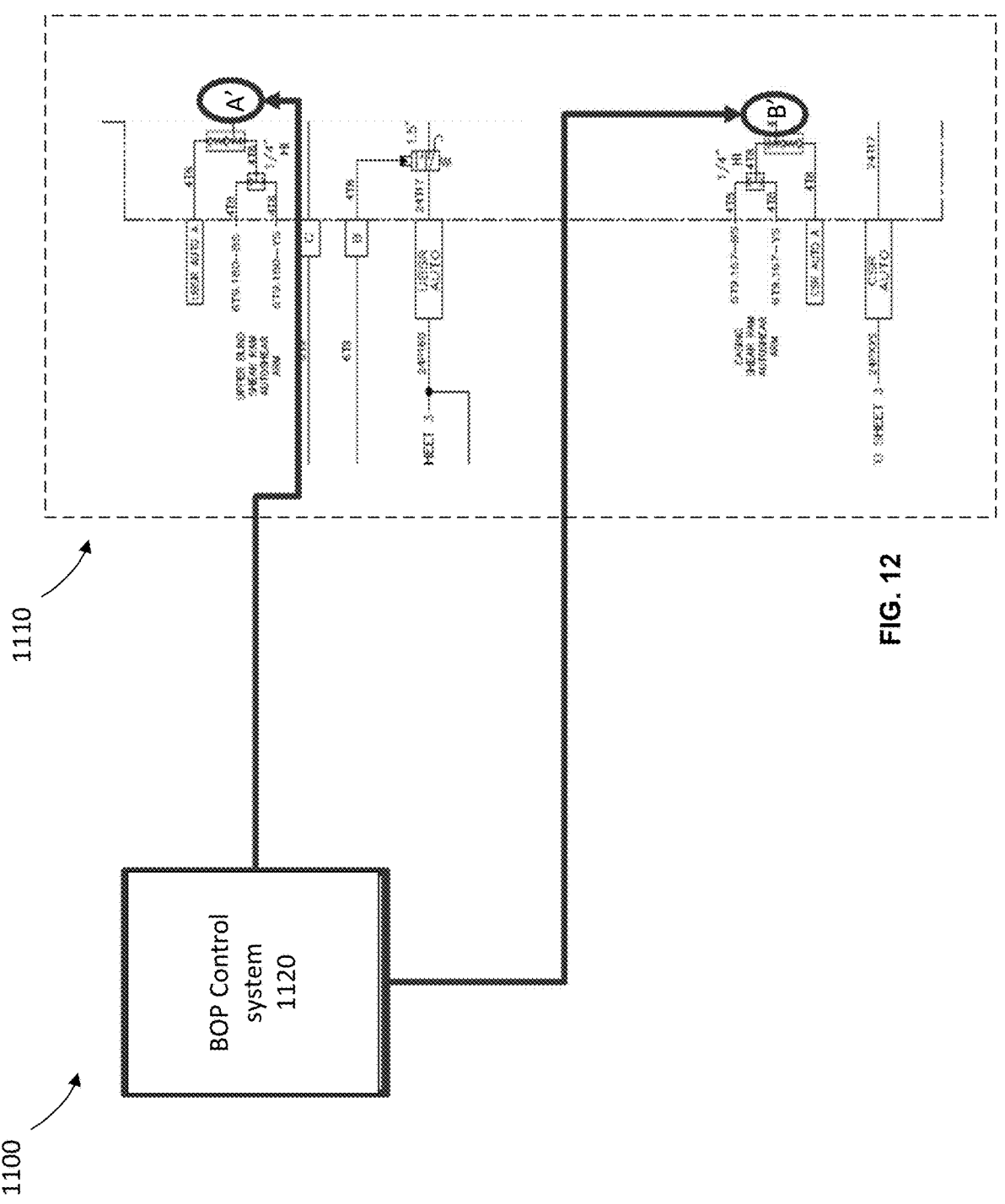
FIG. 12 is a magnified view of a portion of the schematic representation of FIG. 11.

FIG. 12 illustrates a portion of the schematic of FIG. 11 indicating points A' and B' of interface with BOP control system 1120. For example, the point A' can be a node connected to and/or supplying fluids to operate an upper blind shear ram via an autoshear arm in the DMAS system 1106. The point B' can be a node connected to and/or supplying fluids to operate a casing shear ram via an autoshear arm in the DMAS system 1106. The points A' and/or B' can include transducers (e.g., pressure transducers) that can be operatively coupled to the BOP control system 1100. Each shear ram can be associated with isolation valves that can each be operated to select and open and/or close the rams. The BOP control system 1100 can be configured to read signals from the transducers and determined based on the signals which of the shear rams between the upper blind shear ram and the casing shear ram is being selected.

Figure 13:
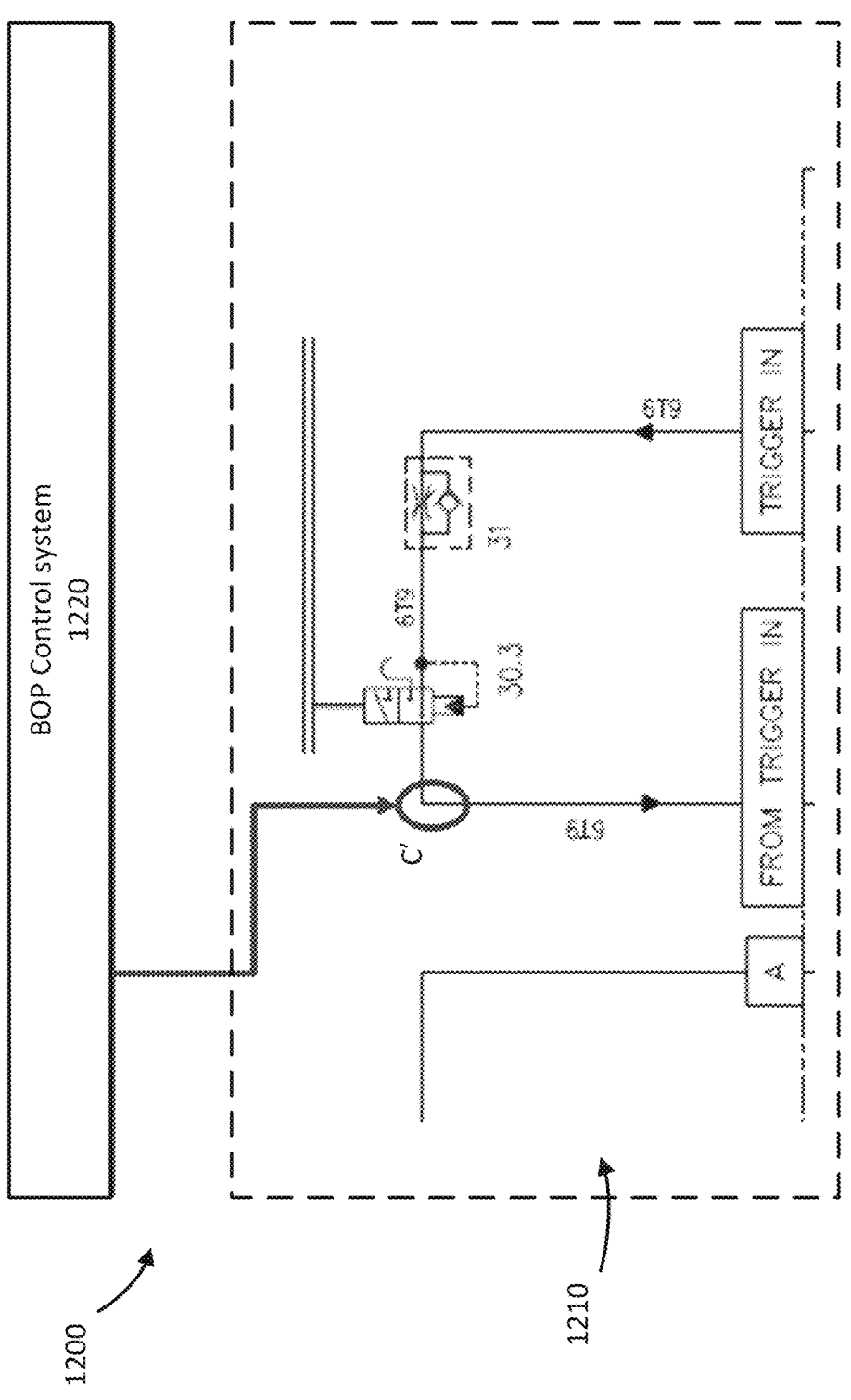
FIG. 13 is a schematic representation of an example implementation of a BOP system, according to some embodiments.

FIG. 13 illustrates a schematic representation of an example implementation of a BOP system 1200, according to an embodiment. The BOP system 1200 can be substantially similar in structure and/or function to any of the BOP systems described herein (e.g., BOP system 100, 200, 600, 700, 800, 1000, and/or 1100), and can be operated according to methods 300, and/or 500. The BOP system 1200 includes a BOP control system 1220. The BOP control system 1220 can, for example, be included in a LMRP (not shown) and the BOP 1210 can be a subsea BOP. The BOP control system 1220 can control a BOP 1210 integrated into a DMAS system. FIG. 13 illustrates a portion of the BOP 1210 indicating points C' interfacing with the BOP control system 1220. In some implementations the BOP control system 1220 can be organized in the form of pods. For example, the point C' can be a node connected to and/or supplying fluids to operate components (e.g., shear rams) via one or more pods included in an existing BOP system. For example, the BOP control system 1220 can be configured to receive and read signals from one or more trigger valves at nodes such as point C' to detect a loss or change of hydraulic and/or electrical signals from the pods. The BOP control system 1220 can determine a state change associated with the BOP 1210 based on the loss or change in signals and based on the determination send suitable downstream commands and/or alerts to a user.

Figure 14:
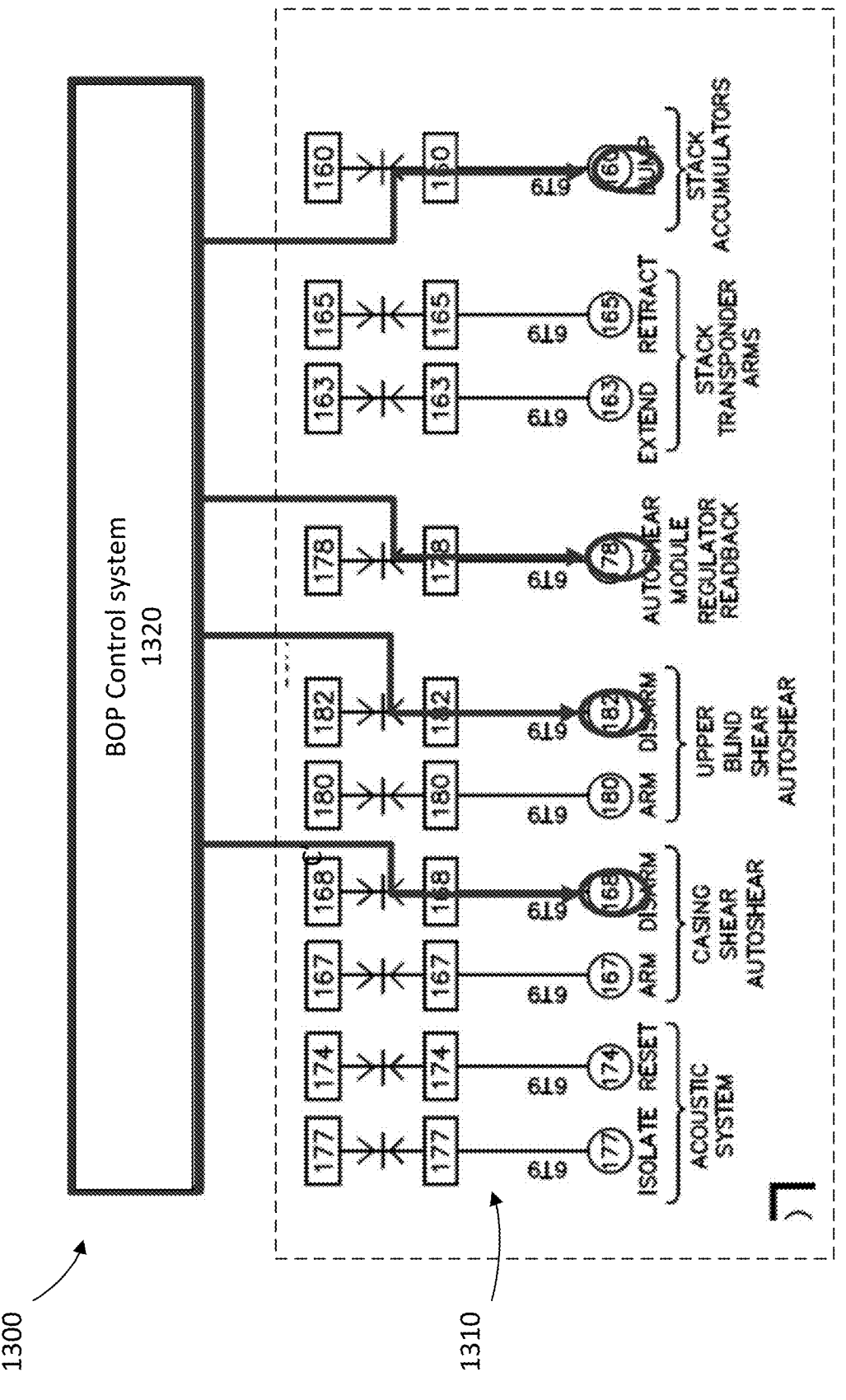
FIG. 14 is a schematic representation of an example implementation of a BOP system, according to some embodiments.

FIG. 14 shows yet another implementation of a BOP system 1300 according to an embodiment. The BOP system 1300 can be substantially similar in structure and/or function to any of the BOP systems described herein (e.g., 100, 200, 600, 700, 800, 1000, 1100 and/or 1200), and can be operated according to methods 300, and/or 500. The BOP system 1300 includes a BOP control system 1320 configured to control a BOP 1310 that can be integrated with a DMAS as described herein with reference to the BOP 1010 illustrated in FIG. 10A. In some implementations, the BOP system 1300 can include an electro-hydraulic multiplexed (MUX) control system wherein some portions of the BOP system are controlled by electrical signals and some portions of the BOP system are controlled by manipulating hydraulic fluid. In some embodiments, the MUX system can be included in the LMRP. In some implementations of such embodiments, the fluid connection for hydraulic controls between the LMRP and the BOP stack can be made using devices called stingers located at the bottom of the LMRP. To connect, the stingers can be extended into corresponding receptacles in the top of the BOP stack. Seals on the stingers can then activated to prevent leaks. In some implementations the stingers can be controlled via the BOP control system 1320 and via one or more control pods organized with respect to the stingers. The BOP control system 1320 can be configured to send and/or receive signals through the pods to the BOP 1310. In some embodiments, the BOP control system 1320 can send and/or receive electrical and/or hydraulic signals to and/or from one or more sensors included in a BOP (e.g., BOP stack). In some implementations, one or more sensors can be organized into sensor nodes, each sensor node defined by a systematically placed collection of sensors, and the electrical and/or hydraulic signals to and/or from the one or more sensors can be directed through one or more sensor nodes.

In some implementations, the BOP control system 1320 can be configured to control several functions by sending and/or receiving signals to/from the BOP 1310 through the pods. For example, as shown in FIG. 14, the BOP control system 1320 can send/receive signals to/from sensors (e.g., sensors 167, 168) indicating arming or disarming a casing shear autoshear, or an upper blind shear autoshear. In some instances, the BOP control system 1320 can receive or send signals to/from an autoshear module regulator readback (e.g., sensor 178). In some instances, the BOP control system 1320 can be configured to receive and/or send signals to sensors associated with stack accumulators, for example, related to dumping hydraulic fluid.

Some of the BOP systems described herein can be implemented to be integrated with existing systems and can be configured to leverages existing, mature, and reliable technologies including a Deadman Auto Shear (DMAS) system and/or an Emergency Disconnect Sequence (EDS) solution. For example, some of the BOP systems described herein can be configured to deliver a fault tolerant and failure resistant DMAS/EDS solution, providing un-interruptible service, retrofittable on deep water rigs, and may be installed in a specified period of time (e.g., less than 1 week of installation time).

According to some implementations, the BOP systems described herein can be configured to be unlike traditional accumulator-based DMAS/EDS with fixed hydraulic circuits whose available capacity diminishes with depth. Said in another way, the BOP systems described herein can function by using hydraulic systems including fluid pumping stations such that they do not operate with fixed hydraulic systems. Therefore, the BOP systems described herein can perform hydraulic operations without diminishing in efficacy with increase in depth of operation due to a potential reduction in power. Any and all of the BOP systems described herein can provide improved functional safety, intelligent control and working hydraulic capacity through simple approaches, compared to conventional systems, by including on-stack integration of a controller based hydraulic power unit for DMAS/EDS operations, capable of transitioning from a heavy accumulator-based system into a lighter depth-compensated hydraulic supply with self-diagnostic functionality.

Figure 15:
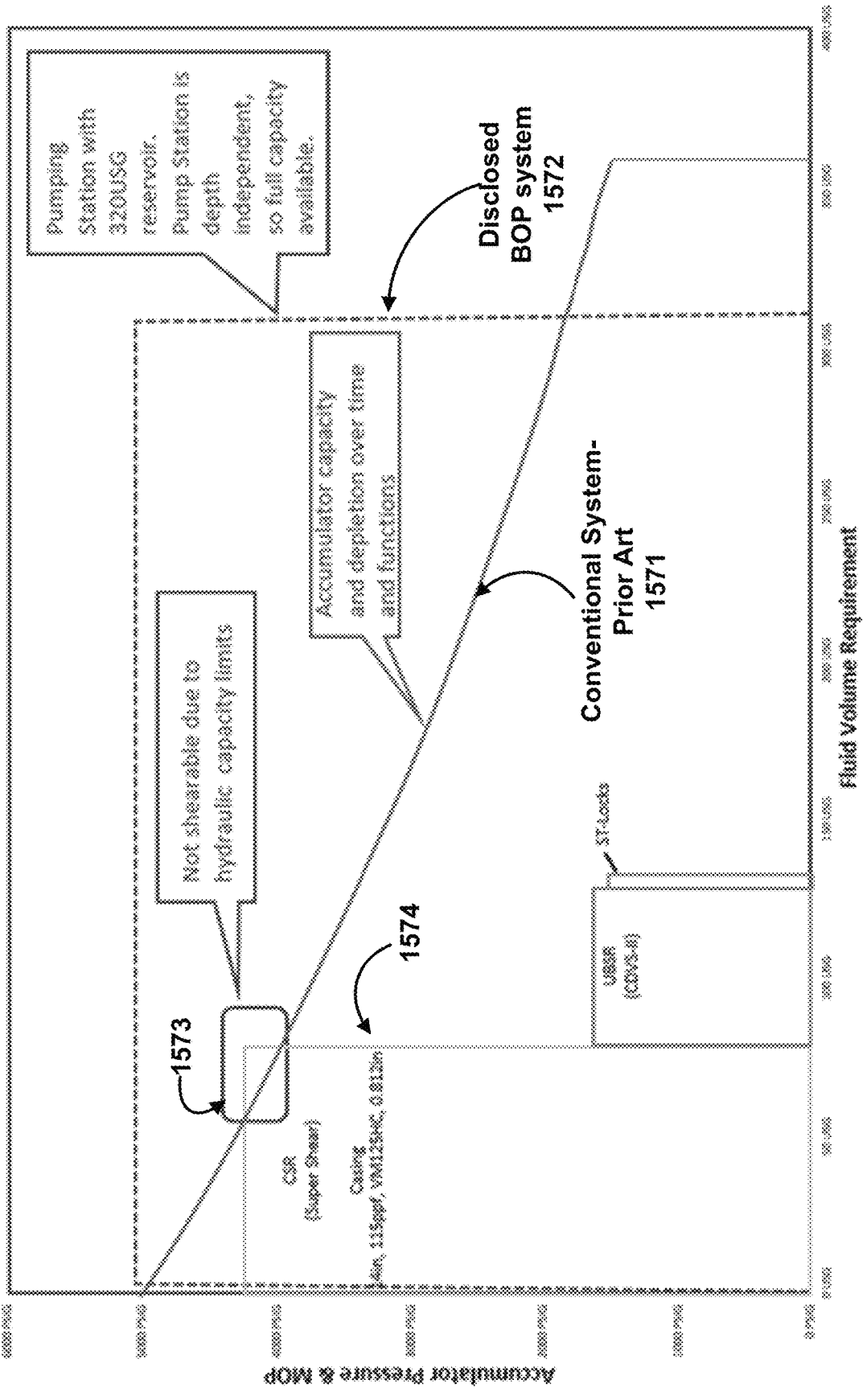
FIG. 15 shows plots of curves depicting fluid volume replacements using a conventional system and a BOP system that utilizes near-instant, respectively, according to some embodiments.
Figure 16:
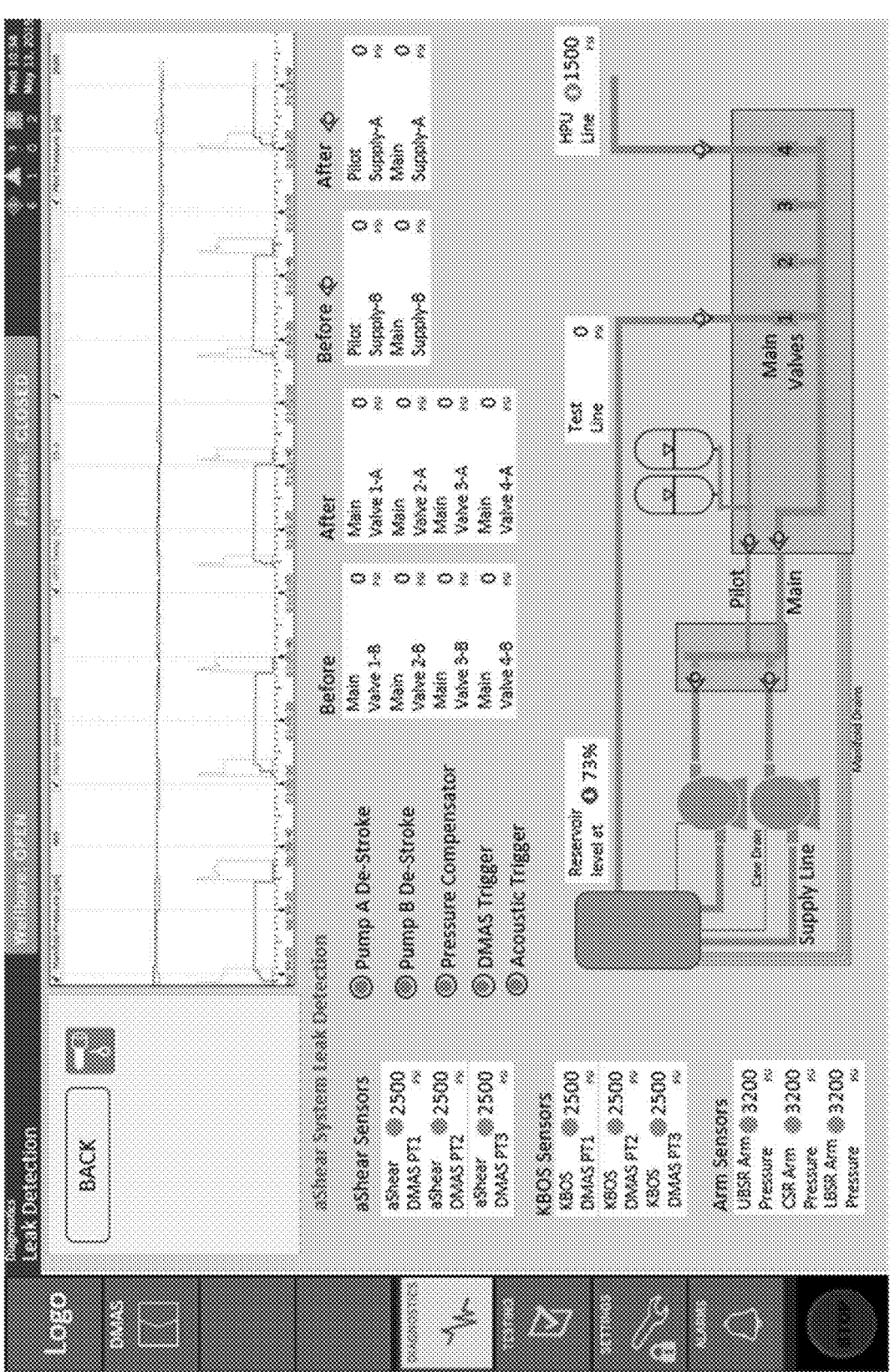
FIG. 16 shows an example user interface indicating information and/or controls offered to an operator during the implementation of a shear leak detection.

As described previously, some of the BOP systems described herein can be configured to enable greater ability to meet volume/pressure demands of hydraulic systems. FIG. 15 illustrates example plots of curves depicting fluid volume replacements using a conventional system and a BOP system as described herein, according to some embodiments. FIG. 15 shows the accumulator pressures (Y-axis) capable by conventional systems as indicated by the curve 1571, and the accumulator pressures capable by the BOP systems described in the instant application, according to some embodiments, as indicated by the curve 1572. As shown by the curve 1571, conventional systems have diminishing accumulator pressures with increase in fluid volume requirement. Additionally, conventional systems cannot meet the pressure requirements to accomplish certain BOP functions, such as performing a Super Shear of Casing which requires sustained pressure with fluid requirement shown by the curve 1574. This is indicated by the portion 1573 of the curve 1574 that overshoots the capacity of conventional systems. However, the sustained high accumulator pressures achieved by the BOP systems described here and shown by the curve 1572 can easily accomplished the Super shear operations indicated by the curve 1574.

Notably, unlike current pressure dump systems that may have a capacity defined by the pressure decline curve (indicated in the solid curve 1571 in FIG. 15), the BOP systems described herein support on-demand pressure continuously with available reservoir volume (as indicated by dashed curve 1572 in FIG. 15). Said in another way, the disclosed system can sustain a strong output pressure that does not decline like the output of a conventional accumulator. The sustained pressure (e.g., pressure plateaus) can be maintained at a desired level for any amount of time (when provided with a suitable battery to power the system). Also, conventional accumulators provide pressure by a single release that only monotonically decreases (as shown by curve 1571 in FIG. 15).

In some implementations, the BOP systems described herein can better meet the target needs of an operation while incurring lower costs compared to conventional systems. Conventional accumulator-based systems typically involve a single pressurization that is followed by a pressure decline as shown by curve 1571 of FIG. 15. Unlike the conventional one-shot mechanism, the disclosed systems can pressurize multiple times by active pumping. This gives the disclosed system a better control to accurately meet the pressure and/or volume demands of an operation.

In some embodiments, the number of times a system pressurizes and/or an amount of increase in pressure at each pressurizing event, is independent of a volume required for an operation and/or a depth associated with an operation. Conventional systems typically lose hydraulic pressure capacity with deeper deployments and require additional volume or accumulator capacity to compensate for increased depths of operation. The active nature of pressurizing used in the disclosed systems provides volume independence of implementation, and the ability to deliver a full capacity of a reservoir (i.e. incurring no loss of volume) at target pressures, regardless of depth. The additional accumulator capacity requirement of conventional systems incurs additional costs. The volume independence and/or depth independence of the disclosed system allows a greater ability to meet volume and/or pressure demands of a hydraulic component regardless of depth, while maintaining lower costs compared to conventional systems as no additional accumulator capacity is needed. Thus, disclosed systems can result in lower costs compared to conventional systems when performing operations at increased depths, without costs associated with additional accumulator capacity and any associated maintenance that is needed to compensate for increased depth.

In some implementations, the disclosed systems can provide additional benefits in meeting regulatory compliance requirements. Some compliance requirements can include, for example, an indication of a probability of failure of elements or components in a BOP system, or an indication of redundancy of pathways and/or elements to perform specific operations, or an indication of reliability associated with elements or components in the BOP system. The disclosed system can be implemented such that, unlike conventional systems, a continuous testing of components is possible to meet such compliance requirements. For example, the continuous testing can be implemented to ensure that every single component or element performs in a sustainable manner, meeting certain technical/mechanical/electrical specifications, and/or without significant degradation. Thus, a continuous assessment of whether each component in a BOP system meets a threshold level of functionality can be performed at specified timepoints and/or intervals. In some instances, the threshold level can be determined based on a defined probability of failure, redundancy, and/or reliability. Continuous assessments can ascertain that a system in use is up to date on meeting regulatory compliance at a higher frequency than conventional systems. Such a continuous assessment can be also performed at a lower cost compared to conventional systems.

Additionally, in conventional systems, testing of pathways and/or components typically includes introducing an amount of wear on the pathway and/or component tested due to the lack of precise control over the operation. For example, testing a shear ram using a conventional system includes less precise actuation which can introduce significant wear of the shear ram and the components/pathways involved in actuating the shear ram (e.g., impact from forceful closure with little control). Such a conventional system therefore presents a deterrent for frequent testing, to prevent wear of the components and pathways. In the disclosed system, however, functional pathways can be actuated with precise control to avoid impact or forceful events during testing (e.g., a soft close option of a shear ram), thus allowing frequent testing without the risk of introducing wear on the system and/or its components and pathways.

In some instances, a degradation associated with one or more components or elements can be detected by an indication of a decline in a pressure curve associated with the element or component. In conventional systems that use accumulators, however, the decline in pressure cannot be addressed to correct the decline. In the disclosed BOP system, however, active pumping can introduce an increase in pressure in a target pathway. The pathway in question and/or the performance of the component in question can be tested for reliability. In some instances, the testing of pathways and/or components can include a measure of efficiency that is compared to a predefined level of efficiency desired of the system. Such a measure of efficiency can be used to partially determine the reliability of the pathway and/or component. In some implementations, the disclosed systems can monitor components and/or pathways by generating truth tables and/or logic tables to help with monitoring and assessment of a state of the system. For example, logic tables can be generated to keep track of every single component in a specific system or a specified set of functional pathways. In some instances, operational specifications of each component (e.g., efficiency of operation, associated pressure measurements, etc.) can be populated such that any deviation from an operational range indicating an issue can be easily identified. For example, an indication of an issue can includes indication of a component failure or an imminent component failure. In some instances, the truth tables can also be used to ascertain a state of compliance with regulatory requirements. For example, in some circumstances regulatory rules can require the availability of at least two pathways that are optimally independent to perform a specified operation (e.g., to close a well). The disclosed system can be configured can use truth tables to determine the functional availability of pathways and whether the system in compliance. For example, the system can be configured to accumulate information (e.g., signature fluctuations in pressure curves from specified pressure sensors) associated with a first functional pathway associated with an operation of choice (e.g., well closure) and determine a first probability of failure of that first functional pathway. In some instances, the system can determine that the first probability of failure is above a threshold level. In some such instances, the system can be configured to identify a second functional pathway and a third functional pathway also associated with the same operation of choice (e.g., the same well closure). The second functional pathway can be determined to have a second probability of failure below a threshold level and the third functional pathway can be determined to have a third probability of failure that is also below a threshold level, thus offering two independent pathways available perform the specified operation of choice (e.g., well closure). Based on this identification, the system can generate a signal indicating that the BOP system successfully meets regulatory compliance.

Some embodiments of the BOP systems described herein can involve lower cost and weight, as they can be implemented upon and/or with existing systems, with minimal additions. In some implementations of the disclosed system, in the event of a replacement of components (e.g., to meet regulatory compliance, to replace with more advance technology) the replacement can be accomplished by replacing just the component and/or technology without incurring enormous additional costs compared to a conventional system which might involve replacement of heavy accumulator systems. In some instances, the minimal additions can be expected to incur relatively reduced costs when compared with costs associated with replacing accumulators or expanding accumulator banks to meet new requirements. Additionally, a reduction in number of components, can result in a reduction in number of potential failure points which in turn can result in lowering total cost of ownership.

In some implementations, the BOP systems described herein support faster direction of pressurized fluid resulting in faster changes in fluid pressures, resulting in faster actuation of components. Said in another way, the BOP systems described here support faster control and/or direction of hydraulic pressure leading to faster manipulation of components and/or faster completion of BOP functions associated with components (e.g., a ram, annular, accumulator, test valve, failsafe valve, kill and/or choke line and/or valve, riser joint, hydraulic connector, and/or the like Thus, in some implementations, the BOP systems described herein can reduce time required to complete BOP functions (e.g., ram open, ram close, shear tubular, seal, and/or the like).

The systems and methods described herein also allow precise control of BOP functions over time. As an example, in some implementations, a shear event can be controlled to within a sub-second interval. In some instances, the BOP systems described herein can improve safety via positive shift in watch window while reducing hydraulic capacity requirements. In some instances, a reduced time required to implement manipulations can increase the duration that the rig can remain on location and/or remain operational, including up to or until the last second required.

Additionally, the BOP systems and operation described herein can offer a longer functional life out of hydraulic components such as rams, as the components may be actuated and/or tested frequently without incurring significant wear. In some implementations, the BOP system can be operated to include a pipe-detection function, which results in an indication of a positive signal when a pipe is detected to be present or a negative signal when no pipe is detected to be present. The results of pipe detection can be used to inform the operation of the BOP system, (e.g., in the manipulation of other functional pathways associated with the pathway in which pipe detection was run).

For example, a functional pathway can be manipulated (e.g., during a test run) while also running a pipe detection such that based on the pipe detection result being a negative signal (i.e., no pipe present) the tested operation can include closing rams using a soft close approach (i.e., rams are not slammed shut with explosive vibration or energy dissipation. Using the soft close approach may also translate to savings in equipment service costs. In some instances, during active deployment for example, when a pipe is detected with a positive signal during ram closure, the system can be configured to receive the positive signal and based on the positive signal a full speed and pressure can be applied. If, however, a pipe is not detected, a portion of travel of the ram (e.g., the last inch of travel) can be managed such that the movement of the rams eases to end of stroke to avoid any explosive or forceful movement and/or impact (e.g., due to "slamming" rams shut) reducing equipment wear. Such an implementation with pipe detection and/or soft closure can offer the disclosed systems the ability to be tested frequently without the risk of damaging the component of the system, whereas in, conventional systems frequently face damage (e.g., minor breaks, pieces coming lose) upon impact from testing.

In some implementations, the disclosed systems can be configured to execute a pipe shearing operation and then perform shear detection to identify a true state of a pipe that was to be sheared following the execution of the shearing operation. In conventional systems, to execute a shearing operation, typically, a sequence of events is performed hydraulically trusting that all components and pathways involved in the operation function exactly as predicted and that the sequence of events run exactly as planned without any unpredictable failures. At the completion of the sequence of events the state of the pipe is assumed to be sheared. There is no way to ascertain the true state of the pipe or the state of any of the components or pathways during the operation. If there is any malfunction (e.g., leakage) or failure to even one component there is risk of the entire operation failure altogether. The disclosed systems, however, can be configured to have real-time control of the operation and the true state of one or more components and/or pathways involved when executing a shearing operation.

In some implementations, the disclosed systems can also be configured to include instrumentation that is configured to monitor the state of the components, receive signals. In some implementations, the signals can be fluctuations in pressure curves associated with specific pressure sensors. In some implementations, the system may use pressure sensors in redundant pathways to receive feedback from components and/or pathways being manipulated to perform the operation. In some implementations the system can receive signals associated with various specified pressure sensors that show changes in pressure curves alerting the system to any unexpected or unpredicted leaks. The system can then be configured to quickly identify and compensate for the potentially unexpected or unpredicted events by implementing counter measures.

Furthermore, upon completion of a shearing operation, the disclosed system can receive signals (e.g., changes in pressure curves associated with pressure sensors) the signals indicating the true state of the pipe (e.g., fully sheared, or only partially sheared). In some circumstances, where the shearing was not fully complete compensatory operations can be undertaken to ascertain a particular result (e.g., line closure) and avert any additional issues or complications. Thus, the BOP systems described herein can be configured such that, unlike conventional (e.g., existing DMAS) systems implemented as a pre-configured hydraulic circuit with no instrumentation or intelligent (PLC based) controls in place, there are redundant sensors to measure application effectiveness. BOP systems described herein can record pressure curves and detect when pipe is sheared, enabling greater insight for decision making during remediation efforts post-DMAS/EDS.

Moreover, implementing the BOP systems described herein, in some instances, operators may not be required to recalculate pressures as deployment to (and at) depth occurs. Some implementations can be self-auditing for regulatory testing. Some such self-auditing implementations can be configured for cost effective maintenance of BOP systems. For example, some such implementations can include a self-auditing function that includes a pre-defined test function configured to assess the condition and/or state of various components included in the BOP system. The pre-defined test function can be configured to be conducted at specified test periods. The self-auditing function can be configured such that test periods can be changed based on test results. For example, in some instances, testing using self-auditing function can enable change in test periods, allowing more time to be applied to day-rate drilling (e.g., 14-day testing may be possible using the BOP systems described compared to 21-day testing period of current existing systems). In some implementations, the BOP system can be configured to perform self-diagnostics and to collect information which may be used to automatically populate regulatory reports and other reports required for compliance.

In some embodiments, the disclosed systems can be configured to implement role-based security, in which pre-defined critical operations or configurations require an authentication (e.g., a personal identification number (PIN)) to be executed. Critical operations can be logged as events by specific authorized individuals, ensuring only trained and qualified users operate the system as intended.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

In this respect, various inventive concepts may be embodied as computer implemented methods. For example, in some embodiments, control, operation, and/or maintenance of one or more components of a BOP system described herein (e.g., pumps, valves, sensors, and/or supply units, etc.) can be implemented via computer implemented methods, using a processor and/or a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. In some instances, the control, operation and/or maintenance may be performed via computer-implemented methods remotely, for example using suitably programmatically configured software communicated through suitable hardware.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different from illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent

What is claimed is:

1. An apparatus, comprising:
a memory; and
a processor operatively coupled to the memory, the processor configured to:
receive instructions to actuate a component in a hydraulic system;
identify a functional pathway in a manifold assembly included in the hydraulic system, the functional pathway coupled to the component and configured to direct pressurized fluid to actuate the component to transition the component away from a first state;

send a first command to an actuator, the first command configured to increase flow of pressurized fluid via the functional pathway to initiate actuation of the component;
receive a signal from a sensor associated with at least one of the functional pathway or the component, the signal indicating a pressure level of the pressurized fluid directed via the functional pathway; and
send, based on a comparison of the pressure level with a predetermined criterion, a second command to the actuator, the second command configured to reduce flow of the pressurized fluid via the functional pathway;
wherein the signal is a first signal and is received after a first time period following the sending of the first command, and the pressure level is a first pressure level, the processor is further configured to:
receive, after a second time period following the sending of the first command, a second signal from the sensor, the second signal indicating a second pressure level of the pressurized fluid directed via the functional pathway, the second pressure level being greater than the first pressure level;
compute a difference between the second time period and the first time period;
infer, based on a determination that the second pressure level is greater than the first pressure level and based on the difference between the second time period and the first time period, a state associated with the component; and
send an alert indicating the state associated with the component.

2. The apparatus of claim 1, wherein the processor is further configured to:
determine, based on the comparison, that the pressure level is below the predetermined criterion;
infer, based on the determination that the pressure level is below the predetermined criterion, a presence of a leak in one or more locations associated with the functional pathway; and
send an alert indicating that the component is unable to function.

3. The apparatus of claim 1, wherein the signal is received after a time period following the sending of the first command, the processor is further configured to:
determine, based on the comparison, that the pressure level is above the predetermined criterion;
infer, based on the determination that the pressure level is above the predetermined criterion and based on the time period, a stage of completion of actuation of the component; and
send an alert indicating the stage of completion of actuation of the component.

4. The apparatus of claim 1, wherein the state associated with the component is a state of a contact with a pipe associated with the hydraulic system.

5. The apparatus of claim 1, wherein the state associated with the component is a state of a shear of a pipe associated with the hydraulic system.

6. The apparatus of claim 1, wherein the component includes at least one of a pipe ram, blind ram, shear ram, or blind shear ram.

7. The apparatus of claim 1, wherein the hydraulic system includes a blowout preventer stack.

8. A method, comprising:
receiving a request for actuation of a component in a hydraulic system, the component being at a first state;

sending, based on the request for actuation, a command to supply pressurized fluid to a predetermined pathway in a manifold of the hydraulic system, the command configured to initiate actuation of the component to transition the component away from the first state and towards a second state;

receiving a signal from a sensor operatively coupled to the hydraulic system, the sensor being associated with the component and the signal configured to provide information indicating a state associated with the component;

inferring, based on the signal, a stage of actuation of the component; and determining, based on the stage of actuation of the component, a degree to which the component is near the second state, wherein the sensor is one of a plurality of sensors and the component is one of a plurality of components included in the manifold of the hydraulic system, such that the plurality of sensors are located at strategic positions along one or more predetermined pathways, and one or more of the sensors from the plurality of sensors is configured to provide information associated with a pressure level of fluid in a location within the manifold that is proximal to one or more of the plurality of components, the method further comprising:

automatically sending a set of commands to supply pressurized fluid via the one or more predetermined pathways;

receiving, in response to the set of commands, a set of signals from the plurality of sensors, each signal from the set of signals indicating a pressure level of fluid in a location within the manifold; and inferring, based on the set of signals, a calibrated measure of actuation of each component from the plurality of components.

9. The method of claim 8, wherein the sensor is a pressure transducer.

10. The method of claim 8, wherein the component includes at least one of a pipe ram, blind ram, shear ram, or blind shear ram.

11. The method of claim 8, wherein the first state of the component is an open state, and the second state of the component is at least one of a state of a contact with a pipe associated with the hydraulic system, a state of a shear of a pipe associated with the hydraulic system, or a closed state.

12. The method of claim 8, wherein the command to supply pressurized fluid includes instructions to pump an identified volume of fluid via the predetermined pathway at an identified rate targeted to transition the component to the second state.

13. The method of claim 8, further comprising:

sending, via an interface, an alert indicating the degree to which the component is near the second state.

14. The method of claim 8, wherein the command to supply pressurized fluid is a first command, and the signal is received at a time period after the first command, the method further comprising:

sending, based on the degree to which the component is near the second state, a second command to cease supply of pressurized fluid to the predetermined pathway, the second command configured to slow down a rate or progression to transition the component to the second state.

15. The method of claim 8, wherein the sensor is a pressure transducer, the signal includes information associated with a pressure level of the fluid at a location proximal to the component, and the signal is received at a time period after the command to supply pressurized fluid to the predetermined pathway, and the inferring the stage of actuation is based on determining the pressure level being greater than a threshold value for an identified portion of the time period.

16. A non-transitory processor-readable medium storing code representing instructions to be executed by a processor, the instructions comprising code to cause the processor to:

receive, from a sensor and at a first time, a first indication of pressure associated with a fluid directed via a manifold of a hydraulic system, the fluid being directed to actuate a component included in the hydraulic system;

receive, from the sensor and at a second time being after the first time by an identified period, a second indication of pressure associated with the fluid directed via the manifold of the hydraulic system;

generate a first comparison of the first indication of pressure and the second indication of pressure with a first predetermined threshold value;

generate a second comparison of the identified period with a second predetermined threshold value;

determine, based on the first comparison and the second comparison, a state associated with the component; and send, based on the state associated with the component, a command to an actuator, the command configured to modulate a flow of the fluid directed via the manifold of the hydraulic system, wherein the first indication of pressure and the second indication of pressure are received within a first time window, the first time window defined to perform a first calibration of actuation of the component, and the identified period is a first identified period, the instructions further comprising code to cause the processor to:

store data associated with the first calibration of actuation of the component;

automatically perform a second calibration of actuation of the component at a second time window following the first time window, the instructions associated with the second calibration of actuation including code to cause the processor to:

receive, from the sensor and at a third time, a third indication of pressure associated with fluid directed via the manifold of the hydraulic system to actuate the component;

receive, from the sensor and at a fourth time after the third time, a fourth indication of pressure associated with the fluid directed via the manifold of the hydraulic system to actuate the component, the fourth time being after the third time by a second identified period;

compare the third indication of pressure and the fourth indication of pressure with the first predetermined threshold value;

compare the second identified period with the first identified period and the second predetermined threshold value; and generate, based on the comparisons, a record of a calibrated operational state of the component.

17. The non-transitory processor-readable medium of claim 16, the instructions further comprising code to cause the processor to:

instantiate a user interface configured to display data related to the first indication of pressure, the second indication of pressure, or the identified period, the user interface further configured to present, to a user, one or more control devices, each control device from the one or more control devices configured to send a plurality of commands to a plurality of actuators included in the hydraulic system, the plurality of actuators being configured to modulate flow of the fluid at predefined portions of the manifold to actuate one or more components included in the hydraulic system.

* * * * *